United States Patent [19]

Brusselmans et al.

[11] Patent Number: 5,313,019
[45] Date of Patent: May 17, 1994

[54] CLOSURE ASSEMBLY

[75] Inventors: Jacques H. F. Brusselmans, Orp-Jauche; Jean-Marie E. Nolf, Korbeek-lo; Amandus L. E. Pieck, Kortenaken, all of Belgium; Alistair A. P. Sutherland, Wiltshire, United Kingdom; Willy E. G. Tournel, Zolder; Lodewijk C. M. Van Noten, Lueven, both of Belgium

[73] Assignee: N.V. Raychem S.A., Kessel-lo, Belgium

[21] Appl. No.: 985,516

[22] Filed: Dec. 2, 1992

Related U.S. Application Data

[62] Division of Ser. No. 689,809, filed as PCT/GB89/01335, Nov. 9, 1989, abandoned.

[30] Foreign Application Priority Data

| Nov. 9, 1988 | [GB] | United Kingdom | 8826250 |
| Feb. 8, 1989 | [GB] | United Kingdom | 8902795 |
| May 30, 1989 | [GB] | United Kingdom | 8912375 |

[51] Int. Cl.⁵ .............................................. H02G 15/04
[52] U.S. Cl. .................................... 174/93; 174/77 R; 174/92
[58] Field of Search ................ 174/93, 92, 88 R, 77 R

[56] References Cited

U.S. PATENT DOCUMENTS

| 3,887,647 | 6/1975 | Yonemitsu et al. | 524/484 |
| 4,117,259 | 9/1978 | Giebel et al. | 174/92 |
| 4,259,540 | 3/1981 | Sabia | 524/525 |
| 4,350,842 | 9/1982 | Nolf | 174/92 |
| 4,361,507 | 11/1982 | Bourland | 523/173 |
| 4,361,508 | 11/1982 | Bourland | 524/505 |
| 4,369,284 | 1/1983 | Chen | 524/490 |
| 4,409,430 | 10/1983 | Boscher et al. | 174/92 |
| 4,497,538 | 2/1985 | Patel | 428/375 |
| 4,617,422 | 10/1986 | Hagger | 524/491 |
| 4,622,436 | 11/1986 | Kinnan | 174/77 R |
| 4,639,483 | 1/1987 | Billigmeier et al. | 524/505 |
| 4,648,606 | 3/1987 | Brown et al. | 174/77 R X |
| 4,732,928 | 3/1988 | Mizushiro et al. | 524/505 |
| 4,822,837 | 4/1989 | Van der Meer | 524/505 |
| 4,874,810 | 10/1989 | Lee, Jr. et al. | 524/505 |
| 4,880,676 | 11/1989 | Puigcerver | 174/77 R X |
| 4,942,270 | 7/1990 | Gamarra | 174/93 |
| 4,963,698 | 10/1990 | Chang et al. | 174/77 R |
| 5,006,669 | 4/1991 | Bachel et al. | 174/93 |
| 5,007,701 | 4/1991 | Roberts | 174/77 R X |

FOREIGN PATENT DOCUMENTS

| 0034042A2 | 8/1981 | European Pat. Off. |
| 0174165A | 3/1986 | European Pat. Off. |
| 0191609A | 8/1986 | European Pat. Off. |
| 0108518A | 1/1989 | European Pat. Off. |
| 0299718 | 1/1989 | European Pat. Off. |
| 3230767 | 9/1988 | Japan ............................... 524/505 |
| WO86/00166 | 1/1986 | PCT Int'l Appl. |
| WO86/01634 | 3/1986 | PCT Int'l Appl. |
| WO87/05304 | 9/1987 | PCT Int'l Appl. |
| 88/00603 | 1/1988 | PCT Int'l Appl. |
| 9005166 | 5/1988 | PCT Int'l Appl. |
| 2021612A | 12/1979 | United Kingdom. |
| 2135139A | 8/1984 | United Kingdom. |
| 2167764A | 6/1986 | United Kingdom. |
| 2168991A | 7/1986 | United Kingdom. |

Primary Examiner—Morris H. Nimmo
Attorney, Agent, or Firm—Herbert G. Burkard; A. Stephen Zavell

[57] ABSTRACT

A method of environmentally protecting an elongate substrate with a cover and a sealing means comprising a sealing material having an elongation of at least 100% and a compression set at 70° C. of less than 30%, which comprises positioning the sealing means around a portion of the substrate and surrounding the substrate with the cover such that the sealing material provides a seal between the cover and the substrate.

22 Claims, 20 Drawing Sheets

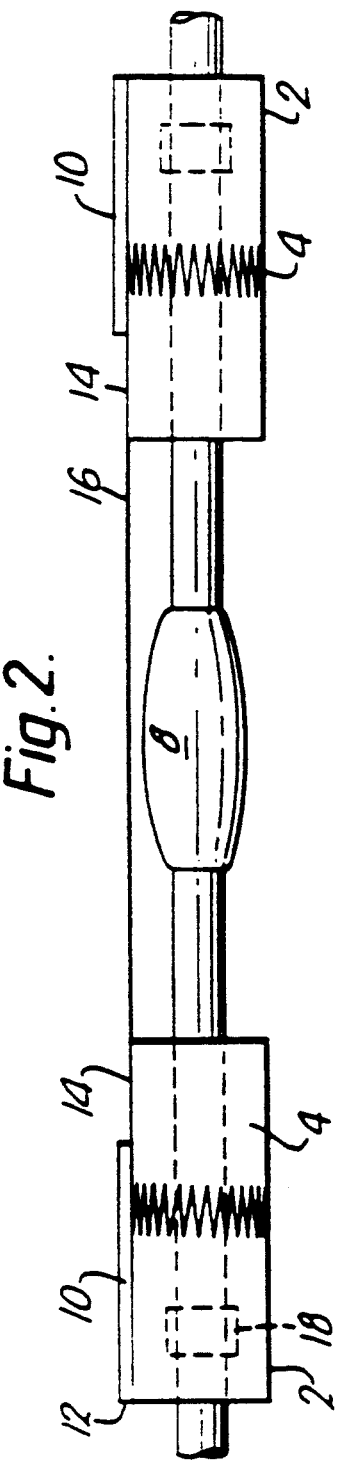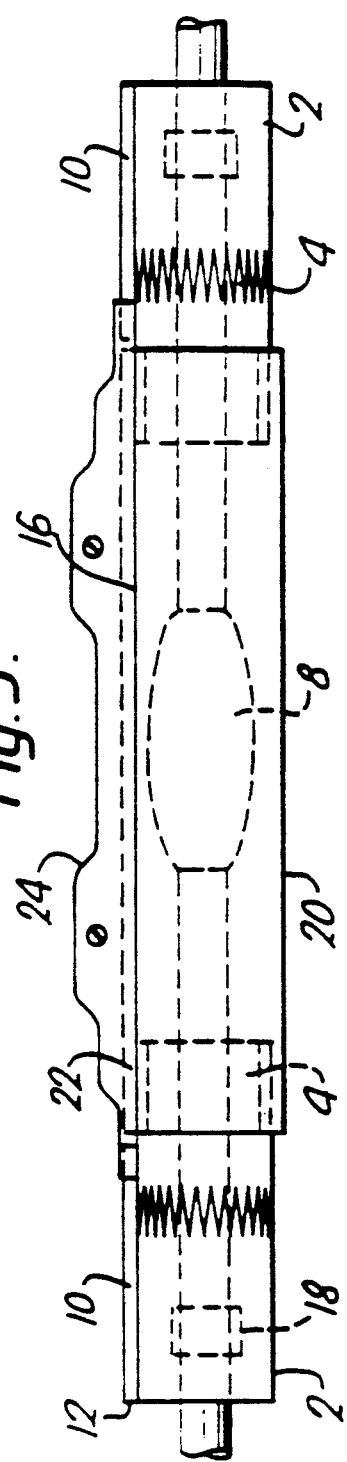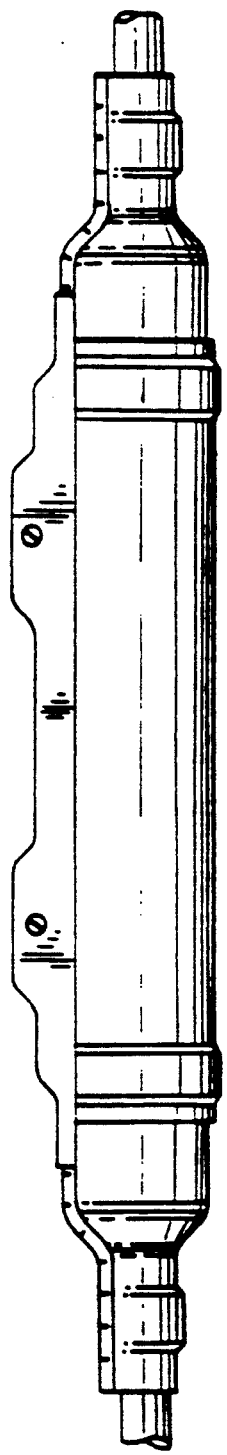

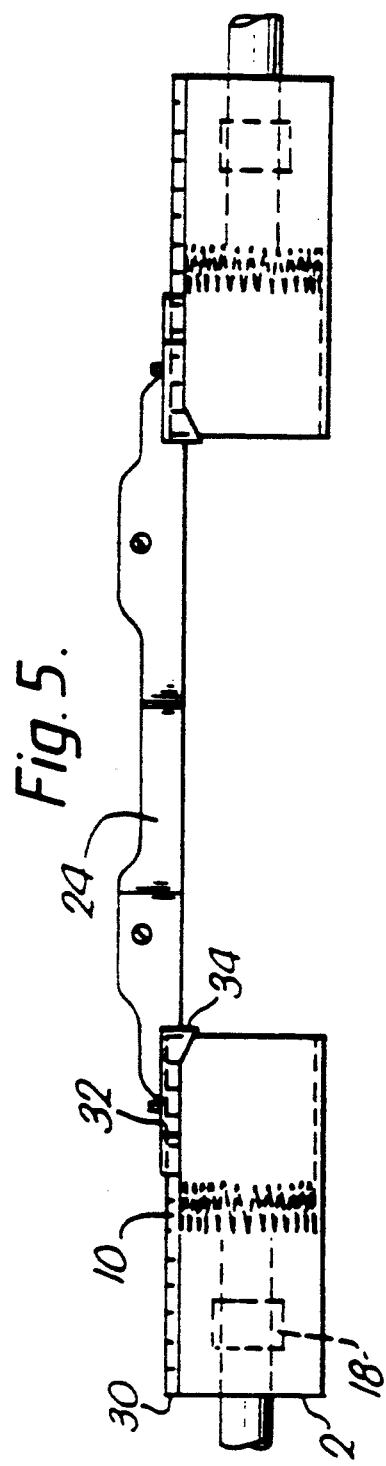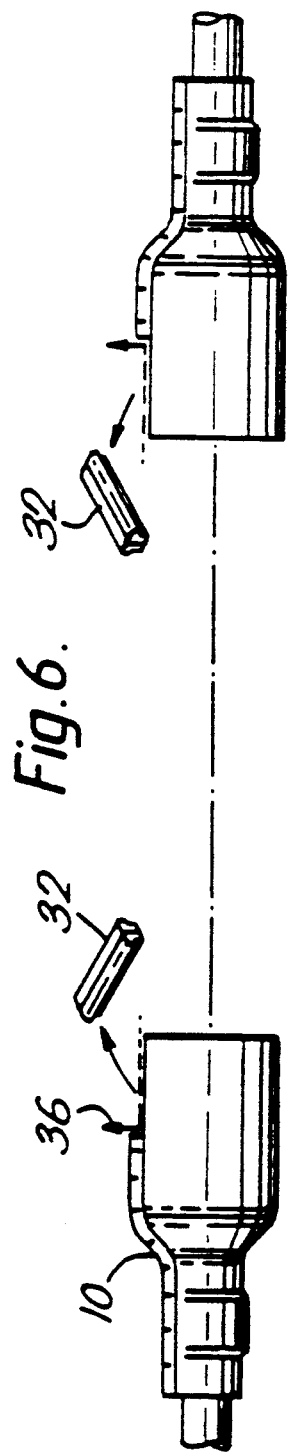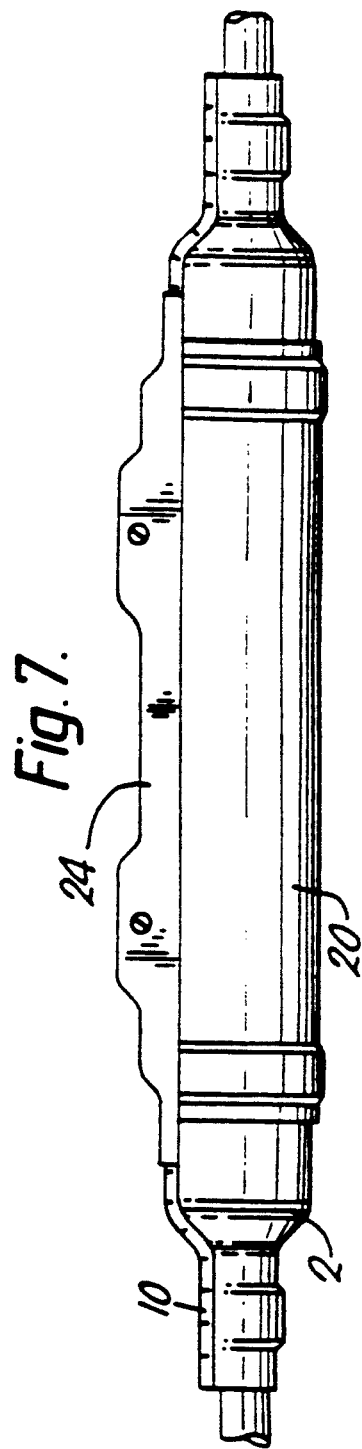

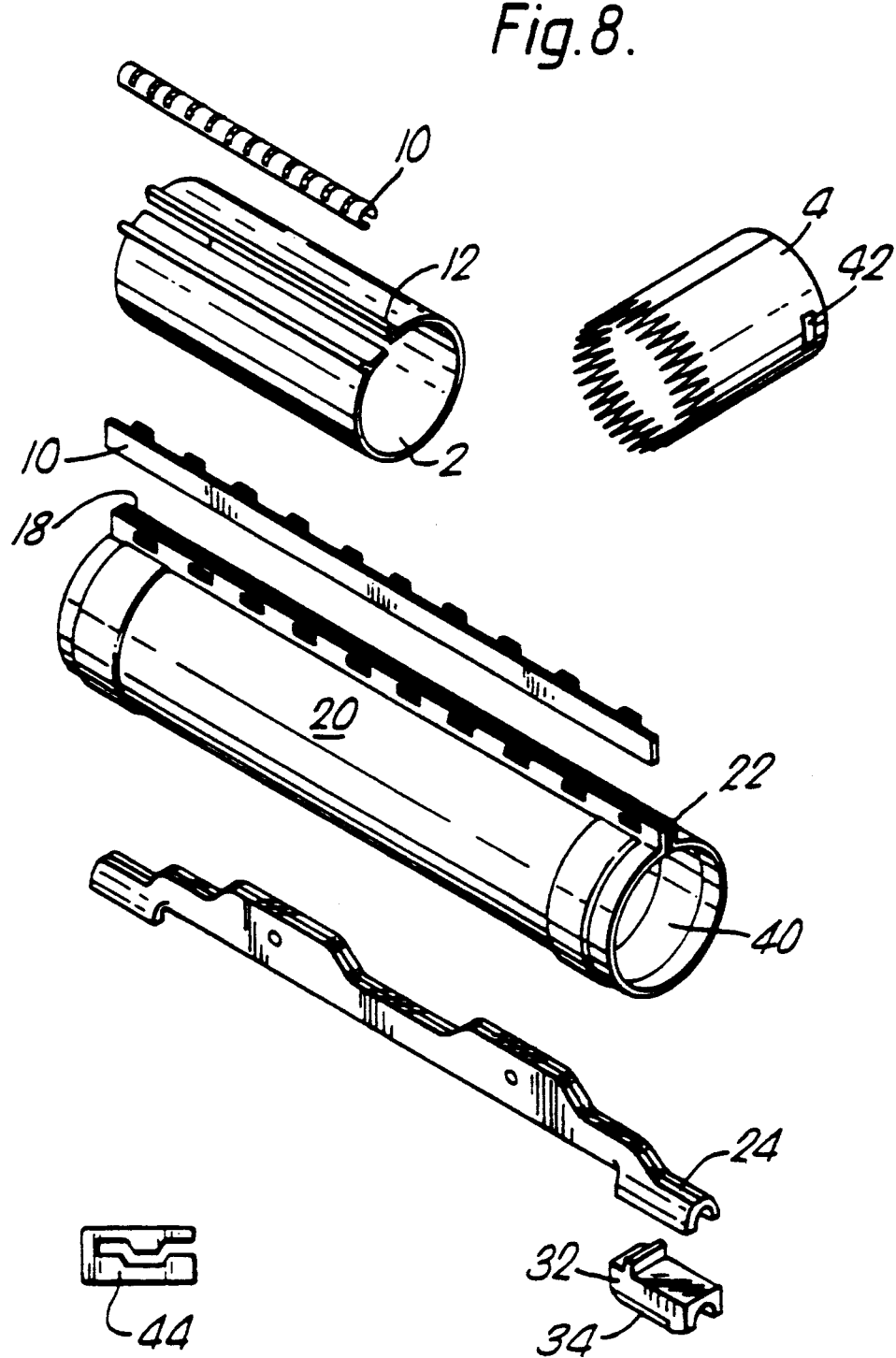

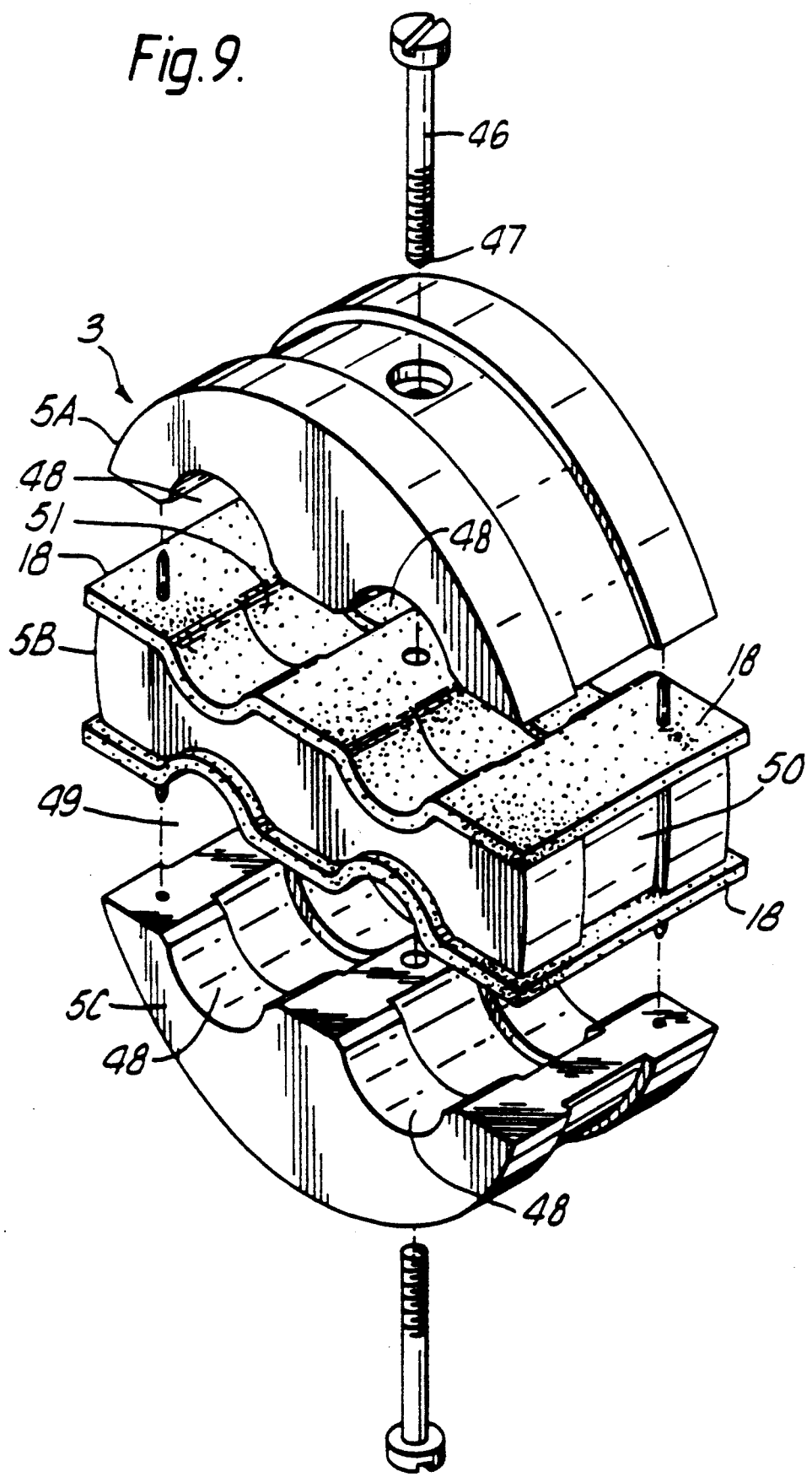

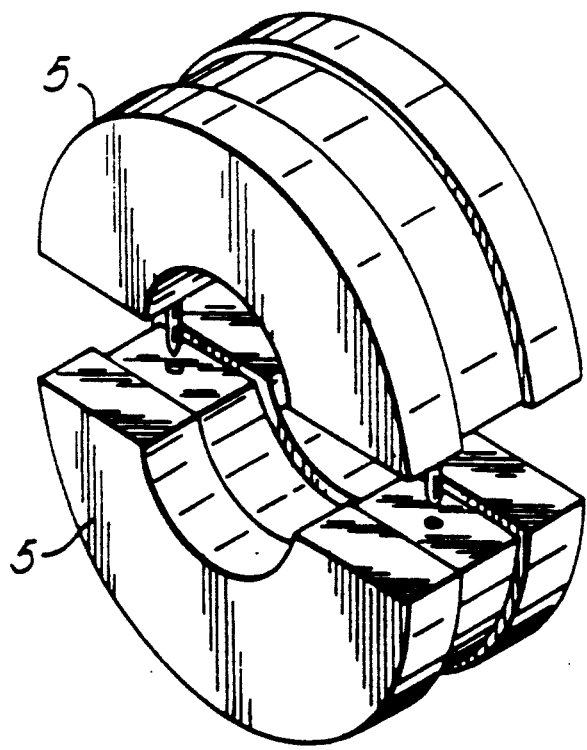
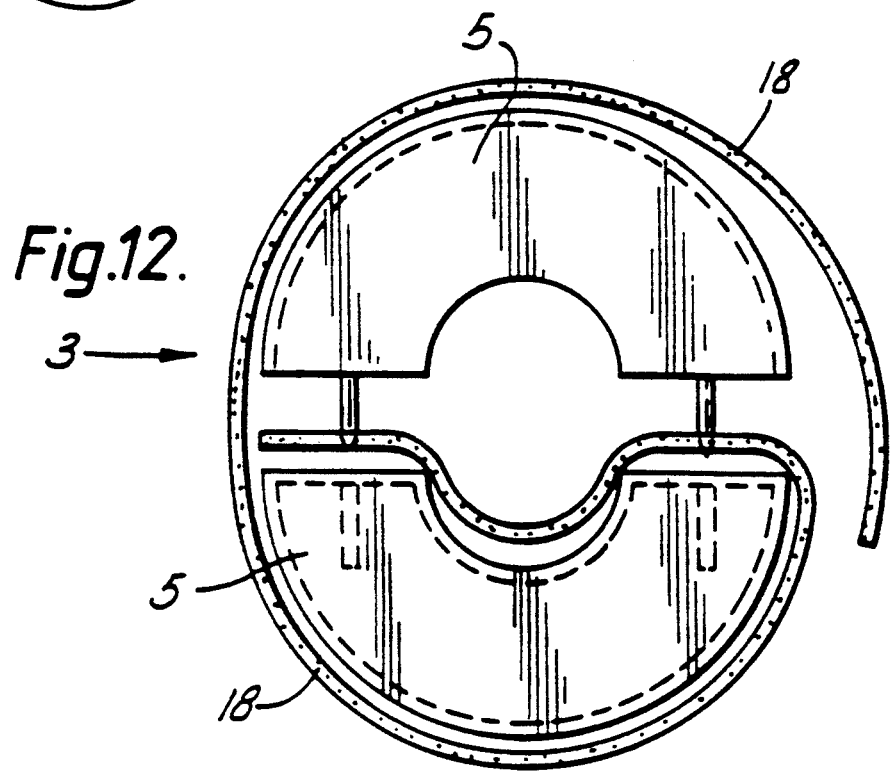

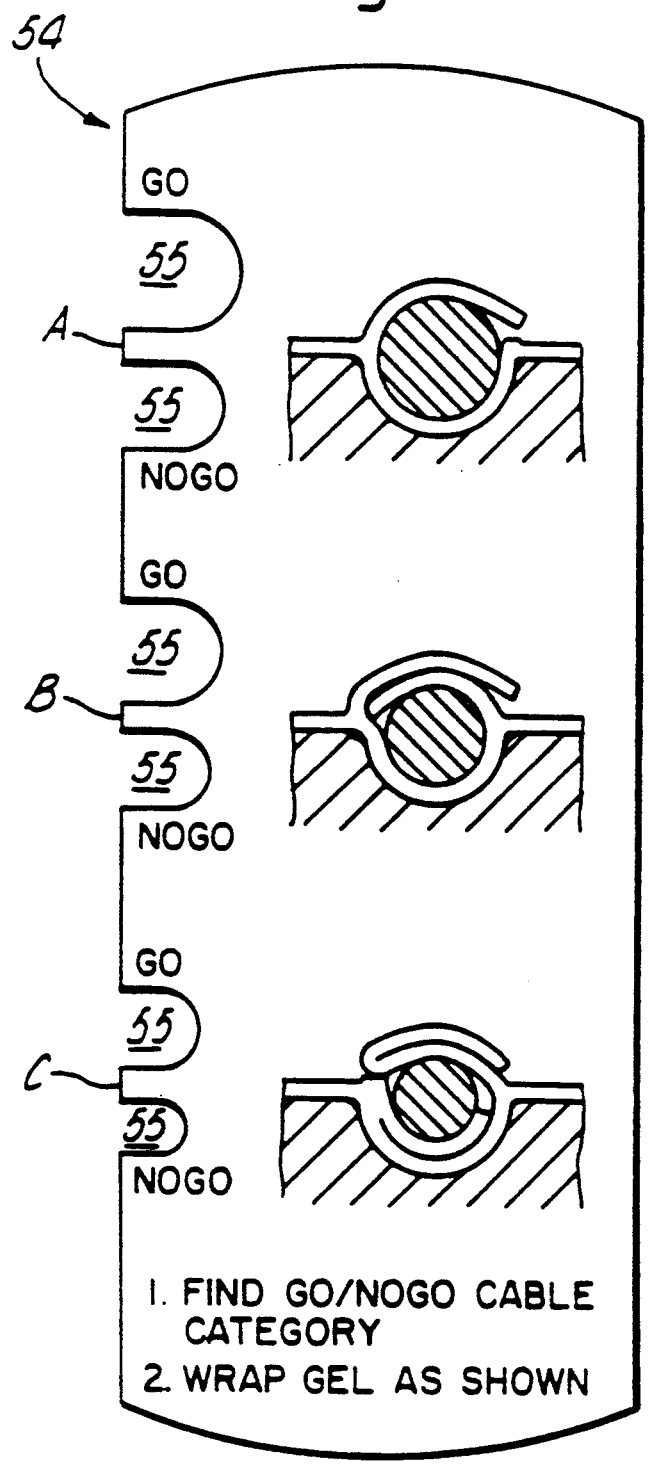

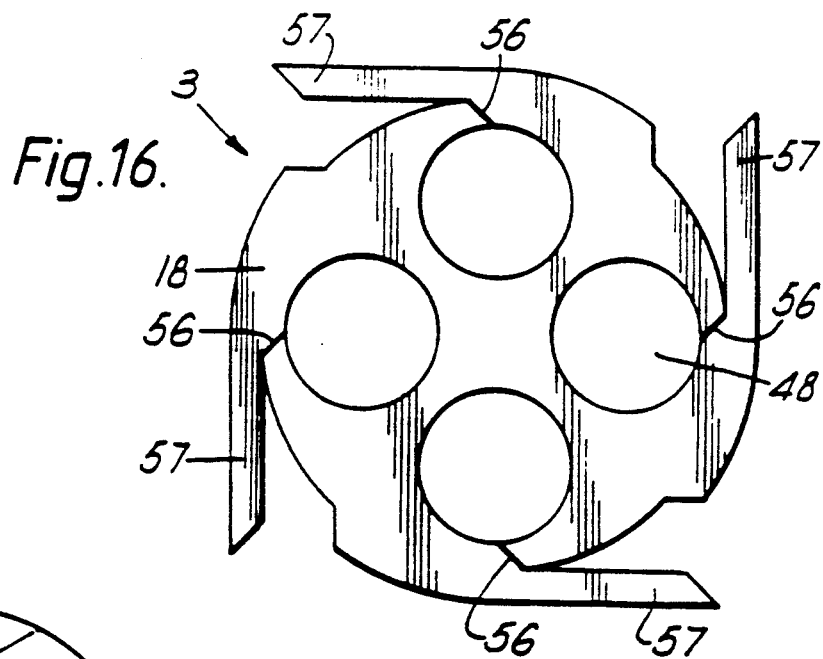
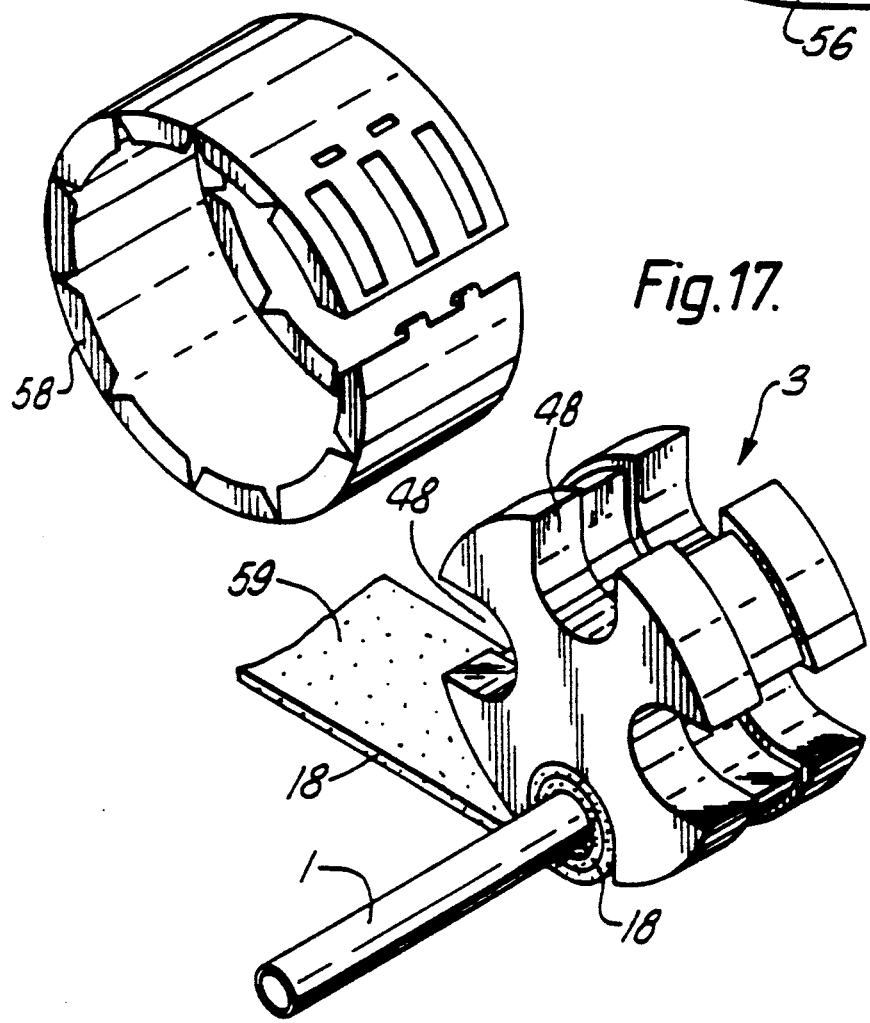

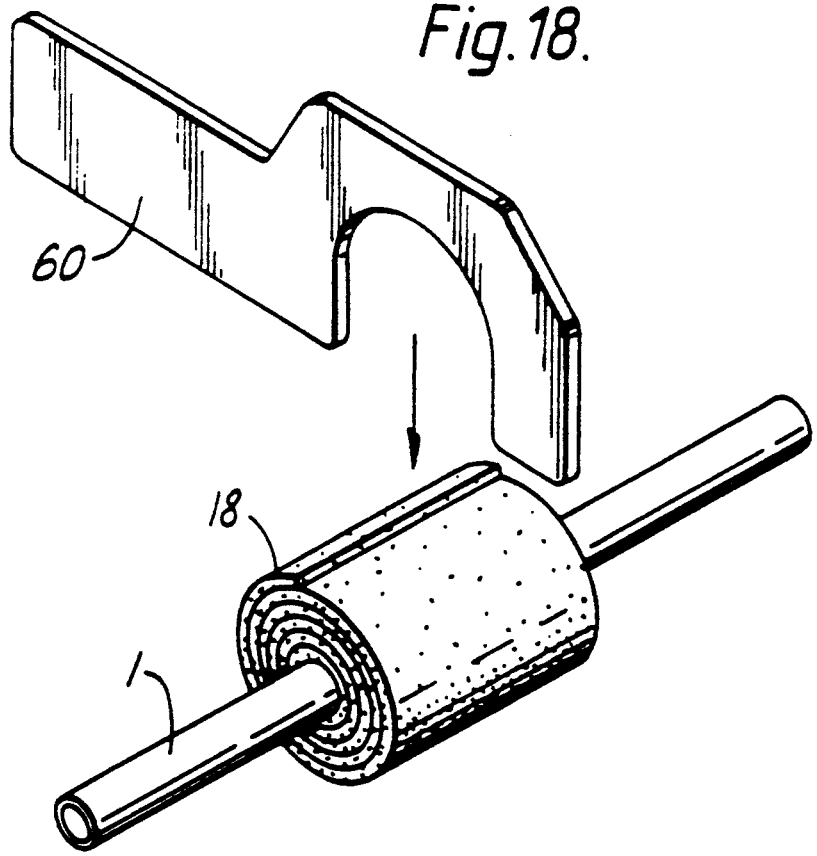
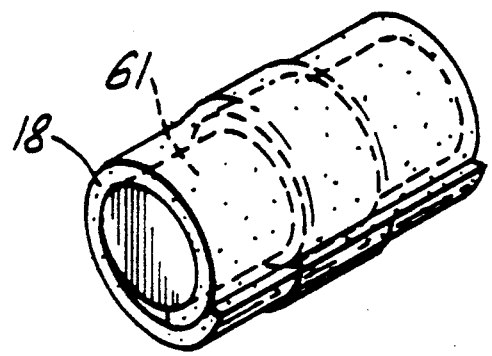

CLOSURE ASSEMBLY

This application is a divisional of application Ser. No. 07/689,809, filed as PCT/GB89/01335, Nov. 9, 1989, now abandoned.

This invention relates to a re-enterable closure assembly for enclosing an elongate substrate such as a splice between telecommunications cables, to a sealing member suitable for use in such an assembly, and for other uses, and to a sealing material useful as part of such a member and for other uses. The term re-enterable means that the closure can be reopened to allow access to the elongate substrate, generally without destruction or removal of the entire assembly.

The use of closure article for enclosing and environmentally sealing elongate substrates, for example splices in electrical cables, such as telecommunications or power cables, is well known. A typical enclosure for an end-to-end splice between cables comprises a heat-recoverable polymeric sleeve having two open ends, which can be positioned around the splice and shrunk by heating to provide seals to the cables.

A heat recoverable article is an article the dimensional configuration of which may be made substantially to change when subjected to heat treatment. Usually these articles recover, on heating, towards an original shape from which they have previously been deformed but the term "heat-recoverable", as used herein, also includes an article which, on heating, adopts a new configuration, even if it has not been previously deformed.

A dimensionally heat-stable article is one whose dimensional configuration does not substantially change when subjected to the relevant installation temperature, and one therefore that does not require configurational change such as shrinkage (as opposed to mere bending etc) for installation. It may be advantageous to avoid the heat energy required for installation of a heat-recoverable article but hitherto satisfactory seals have required heat-shrinkage.

A typical, and commonly used wraparound closure is disclosed in British Patent No. 1155470. This describes a wraparound sleeve formed as an elongate sheet or split tube which is wrapped around the cable. The sleeve has two upstanding rails that may be secured together in abutment by a closure channel, made for example from stainless steel. One of the rails is usually located at one longitudinal edge of the sleeve while the other rail may be spaced from the other edge of the sleeve, the sleeve portion between said other rail and its adjacent sleeve edge forming a longitudinal flap that extends beneath the abutting rails. The flap thereby helps to provide environmental sealing beneath the abutment of the rails. Alternatively the flap may be separate. Such a splice closure is commonly referred to in the art as "a rail and channel" closure.

Re-enterable splice closures are also known. These are required for example where it is desirable to be able to gain access to the splice, for example for observation of faults, for repair, or for modification of the splice.

Examples of re-enterable splice closures are described in European Patent Publication 0068705 (Raychem) and European Patent Publication 0092347 (Raychem). Each describes rail and channel closures in which the rails plus channel may be cut off along the entire length of the sleeve, and a central section of the sleeve removed. A new sleeve may then be recovered around the two remaining butts of the old sleeve, and in order to get good sealing special provision is made to supply sealant to fill any void between the remnants of the old rails. The re-entry requires the use of cutting tools, and the reclosure requires provision of a new sleeve.

We have now designed a re-enterable closure which allows easy re-entry and preferably toolless reclosure.

We have further designed a sealing means that can provide a seal between a cover, such as a sleeve, and a substrate, such as a cable.

We have still further formulated a sealing material having improved properties.

Thus a first aspect of the invention provides a method of environmentally protecting an elongate substrate with a cover and a sealing means comprising a sealing material having an elongation of at least 100% and a compression set at 70° C. of less than 30%, which comprises positioning the sealing means around a portion of the substrate and surrounding the substrate with the cover such that the sealing material provides a seal between the cover and the substrate.

The invention in a second aspect provides a sealing means for forming a seal between a cover and an elongate substrate, the sealing means comprising a sealing material having an elongation of at least 100% and a compression set at 70° C. of less than 30% and a substantially rigid portion.

The invention further provides a sealing material having an elongation of at least 100% and a compression set at 70° C. of less than 30% and a dynamic storage modulus at 23° C. and at 1 Hz of less than $10^7$ dynes/cm$^2$.

The sealing means may comprise a sealing material and a relatively (preferably substantially) rigid portion, the sealing material providing a seal between the substantially rigid portion and the cover. The substantially rigid portion may have a hole therethrough, through which the substrate may pass. The sealing material may initially be separate from the rigid portion, and may for example be wrapped around the substrate. Alternatively, it may be provided affixed to the rigid portion, for example by injection moulding. The sealing material may comprise a relatively hard portion and a relatively soft portion, for example harder and softer gels. The softer material may be positioned between portions of harder material and thereby be held in place. A compressive force may be provided on the sealing material, forcing it against the substrate, and the cover and/or the rigid portion. This may be achieved by bringing together two plates in an axial direction with respect to the substrate, causing radial displacement of sealing material to seal to the substrates and/or cover. Pairs of plates may be provided at ends of a splice case.

A sealing means may be positioned around the substrate at two spaced apart portions thereof, for example at either side of a cable splice, and the cover positioned to bridge the two sealing means, thus for example providing a splice case around the splice.

Two aspects of the invention, namely an environmental closure, and a sealing material will now be discussed, the sealing means being discussed in connection with FIGS. 9–20 of the drawings.

The Environmental Closures

The closure preferably comprises a cover, such as a sleeve, particularly a wraparound sleeve, preferably dimensionally heat-stable, sealed to the substrate by means at least of the sealing means.

The cover preferably comprises a dimensionally heat-stable sleeve which is preferably held in its closed configuration by a securing means. This securing means is preferably also re-openable and reusable. As an example the dimensionally heat-stable sleeve may comprise a wraparound sleeve with upstanding rails.

The securing means may comprise a clamp which can be tightened by mechanical means (such as screws or bolts) to secure the rails together. Then, all that is required to re-enter the assembly is to release (unscrew) the securing means and open the dimensionally heat-stable sleeve.

In one embodiment, the clamp may comprise an elongate channel that has a portion c-shaped in cross-section that can be positioned over rails of the sleeve to hold the rails together. Such a channel may be snapped over the rails radially with respect to the sleeve or slid along them longitudinally. At least one of the rails may comprise a remarable point (such as a rod that engages a slot or recess in a fixed part of the rail) that locks the channel in position. The channel may engage the other rail in a hinge-like manner. In this case the channel may be positioned over the rails radially, and the rod or other part positioned (for example to fill a gap between channel and fixed part of the rails) to prevent radial removal of the channel. This may be desirable if the channel or a part of the sleeve between the rails is to carry a gel or other sealing material since shearing action on the gel (that may result from the channel being slid longitudinally onto the rails) may be avoided. The channel may incorporate means, such as a longitudinally extending recess or reservoir, for retaining a gel. Such gel may provide a seal between the longitudinal edges of the sleeve between the rails that are brought together when the sleeve is held in its closed configuration. The gel may contact and therefore seal to end seals of the to-be-formed splice case that seal between ingoing cables and the sleeve. The gel reservoir may be spring loaded or other resilient means be provided to compress the gel in the desired direction.

The dimensionally heat-stable sleeve is preferably tubular and open at both ends. It is preferably used in combination with and overlapping a said sealing means at one or each end, although a heat-recoverable sleeve may be used alternatively or additionally at one or each end. This combination can be used to enclose an in-line or butt splice between two or more cables.

For sealing the dimensionally heat-stable sleeve to the heat recoverable sleeves (where used) sealing material may be wrapped circumferentially around the circumference of an end portion of each heat-recoverable sleeve. Alternatively, or additionally, sealing material may be internally wrapped within end portions of the heat-stable sleeve. A sealing strip, preferably of similar material, may also be used to seal between the longitudinal edges of the wrapped heat-stable sleeve.

Thus the dimensionally heat-stable sleeve may be sealed to the heat-recoverable sleeves. To complete the enclosure the heat-recoverable sleeves need to be recovered onto the substrate, generally cables either side of a splice. When this recovery takes place hoop stresses are generated in the sleeve causing the longitudinally opposed edges to tend to pull away from each other. The closure means, for example the channel for a rail and channel closure, prevents such "pull away", but in the present invention it preferably extends along part only of the length of the sleeve. Hence, portions of the sleeves are not held together. Two solutions to this problem are now described.

According to a first solution the heat recoverable wraparound sleeves are pre-installed in the factory onto a wraparound liner by partial recovery. In this case at least a length of the sleeve intially has no closure means, e.g. no rail or channel, and at least that length of the sleeve which has no closure means is pre-installed. This preinstallation may be carried out in the factory by temporary provision of a closure means on that portion to resist the hoop stresses of recovery. The installation is effected so that the wraparound opening of the sleeve and liner coincide so that the combination can still be reopened in the field. Also there is no adhesive used between the liner and sleeve so there is no bonding. Preferably the liner does not extend along the whole length of the sleeve.

According to a second solution the heat recoverable sleeve(s) are recovered before installation of the dimensionally heat-stable sleeve. In this case an insert closure means is preferably provided temporarily to hold closed that portion of the sleeve along which there is no closure, while recovery is carried out. This insert is then removed prior to installation of the dimensionally heat-stable sleeve and its securing member. For example, where the heat-recoverable sleeves comprise rails with a channel extending along part of their length, the rails preferably extend along the entire length of each sleeve, and a short insert closure is preferably positioned over the remaining exposed parts of the rails to hold the sleeve closed along its entire length during recovery. The extra rail section, together with the short insert closure may be removed, e.g. by use of a cutting wire, after recovery, to provide a flat section onto which the dimensionally heat-stable sleeve (and its securing means) are positioned.

Where the elongate substrate is branched, e.g. where it comprises two or more cables entering a splice, it may be necessary to seal the crutch of the branch region. This may be achieved using a branch-off clip in conjunction with heat-recoverable sleeves, for example as described in U.K. 1604981 or in E.P. 83302627. We prefer, however, that the sealing means comprises a substantially rigid portion having a hole therethrough for each branching cable. Each cable is sealed to its respective hole by the sealing material.

Splice closures according to the invention may advantageously be secured to a stable object e.g. to a wall. This may conveniently be carried out by fixing the securing means to the wall.

The Sealing material

This invention also relates to a sealing material such as a gel (which term herein includes gelloid) composition. By gel is meant a liquid-extended polymer composition preferably having a cone penetration value (measured by a modified version of ASTM D217, as described below) within the range from 30 to 400 ($10^{-1}$ millimeters); an ultimate elongation (measured by ASTM D412 as described below) greater than 100%, with substantially elastic deformation to an elongation of at least 100%. The composition may either contain three-dimensional cross-linked molecular formations or may merely behave as if it contained such molecular formations (gelloids). Two or more gel etc. of different properties may be used together, for example a softer gel to provide a seal and a harder gel to locate the softer gel and to apply pressure to it.

The invention is more particularly concerned with gel or gelloid compositions comprising a block copolymer having relatively hard blocks and relatively elastomeric blocks (e.g. hydrogenated rubber blocks) examples of such copolymers including styrene-diene block copolymers (linear or radial) for example styrene-butadiene or styrene-isoprene diblock or triblock copolymers, or styrene-ethylene-butylene-styrene triblock copolymers.

Oil-extended compositions of block copolymers are known, for example from U.S. Pat. Nos. 3,676,387 (Lindlof), 3,827,999 (Crossland), 4,176,240 (Sabia), and 4,369,284 (Chen), and it has previously been found necessary to subject copolymer-oil adhesive compositions to radiation cross-linking in order to modify their physical and adhesive properties, as described for example in U.S. Pat. Nos. 3,845,787 (Haefele) and 4,151,057 (St Clair) and in "Radiation Curing of PSA's Based on Thermoplastic Rubbers" by D. J. St. Clair, in *Adhesives Age*, March 1980, pages 30–36.

WO88/00603 (Raychem), the disclosure of which is incorporated herein by reference, discloses a gel or gelloid composition comprising an intimate mixture of (a) a block copolymer containing relatively hard blocks and relatively elastomeric blocks; (b) additional polymer or copolymer material having at least partial compatibility with, and a higher glass transition, softening or melting temperature than, the hard blocks of the said block copolymer; and (c) an extender liquid which extends and softens the elastomeric blocks of the said block copolymer.

Useful compositions may be prepared comprising at least 500, preferably at least 1000, and preferably not more than 5000 parts by weight of the extender liquid per 100 parts by weight of the said block copolymer. The extender liquid preferably has a boiling point higher than the softening or melting temperature of the mixture of the said block copolymer and the said additional polymer or copolymer, and the said additional polymer or copolymer at a temperature not less than the melting or softening temperature of the mixture of the said block copolymer and the said additional polymer or copolymer. Mastication or other mixing techniques at lower temperatures, perhaps with the aid of volatile solvents, may however be used if the resulting composition is acceptable for the intended end use.

An especially interesting class of block copolymer for the purposes of this invention are those wherein the hard blocks comprise polystyrene. The weight ratio of the hard blocks to the elastomeric blocks in those (and other) copolymers is preferably within the range from 0.25:1 to 0.75:1.

The preferred additional polymers for styrene block copolymers are polyphenylene ethers, for example poly (2,6-dimethyl-1,4-phenylene) ether (also known as polyphenylene oxide), which have substantially complete compatibility with the polystyrene blocks. Substantially complete compatibility of the additional polymer or copolymer with the hard blocks of the block copolymer is preferable in all cases, and can usually be recognised by a substantial increase in the glass transition temperature of the hard blocks.

The additional polymer or copolymer is preferably present in an amount sufficient to increase significantly, for example by at least 10° C., or even 15° C., the softening or melting temperature of the composition over that of the same composition without the said additional polymer or copolymer. It has been found useful to include 0.3 to 3, preferably 0.5 to 1.5, more preferably 0.7 to 1,4, parts by weight of the said additional polymer or copolymer per part by weight of the hard blocks in the said block copolymer.

Although cross-linking may be avoided it may still be effected if desired, and may produce further improvements in properties. Cross-linking, however tends to increase the hardness of the composition at room temperature, whereas the use of the additional polymer according to the present invention improves temperature performance without significantly increasing the hardness.

Within the specified range of cone penetration values and ultimate elongations for the gels and gelloids those having a cone penetration within the range from 100 to 300 ($10^{-1}$ millimeter) and an ultimate elongation of at least 200% are preferred. Substantially elastic deformation up to an elongation of at least 200% is also preferred.

Among useful block copolymers are the hydrogenated styrene-diene block copolymers in which the styrene blocks have a molecular weight within the range from 2000 to 50000 and the diene blocks have a molecular weight within the range from 20000 to 300000. Preferred are those having at least two styrene end-blocks and at least one diene midblock, the styrene end blocks comprising up to 55% by weight of the block copolymer. Examples include poly(styrene-ethylene-butylene-styrene) triblock copolymers, generally referred to as SEBS triblock copolymers. These copolymers have styrene end blocks and ethylene and butylene centre blocks and are characterised by the ratio of styrene blocks to the combined ethylene-butylene blocks and by molecular weight (for example peak molecular weight). Blends of two different SEBS triblock copolymers e.g. as described in copending U.S. patent application Ser. No. 801018 (Gamarra), the disclosure of which is incorporated herein by reference provide oil extended elastomers according to this invention having certain desired cone penetration, elongation and tensile strength properties.

Useful extender liquids may be selected from oils conventionally used to extend elastomeric materials. The oil may be a hydrocarbon oil such as paraffinic or naphthenic oils, synthetic oils such as polybutene or polypropene oils, and mixtures thereof. The preferred oils are mixtures of non-aromatic paraffins and naphthenic hydrocarbon oils. The oils should have a minimum boiling point higher than the softening point of the mixture of the block copolymer(s) and the additional polymer or copolymer. The ratio of polymer mixture to the oil will generally range from 2 to 30 parts polymer mixture to 70 to 98 parts oil. In the disclosure of WO88/00603 (Raychem) it is preferred to use 3 to 10 parts triblock copolymer with 97 to 90 parts oil and most preferred for many applications to use from 4 to 8 parts triblock copolymer, with 96 to 92 parts oil.

The composition is preferably prepared by mixing the oil with a blend of the block copolymer(s) and the additional polymer or copolymer at a temperature not less than the glass transition temperature of the hard blocks of the said block copolymer in the blend, the glass transition temperature of the hard blocks having been raised by the blending. In order to achieve adequate mixing and for the polymers to melt fully and disperse in the oil, sufficiently high temperatures and sufficient mixing shear are preferably used. The mixing at the elevated temperature should be continued until the mixture is uniform and all of the polymers are evenly dispersed or blended in the oil. After sufficient mixing, the composition is then poured into the desired moulds or shapes and allowed to cool. The resulting elastomeric composition can be re-melted and again cooled without any significant change in physical properties.

Useful styrene-diene block copolymers include the SEBS triblock copolymers discussed above, poly(styrene-butadiene-styrene) block copolymers (SBS), poly(styrene-isoprene-styrene) block copolymers (SIS) and similar styrene-diene block copolymers known in the art. The SEBS block copolymers are preferred in some applications.

It may be useful to use various additives for various purposes in any of the compositions of this invention. Such additives may be stabilisers, antioxidants, flame retardants, tackifiers, corrosion inhibitors and the like. It is useful to use antioxidants in all the compositions of this invention.

The sealing material of the present invention preferably comprises a gel having a compression set (as determined by ASTM 395-A5) at 70° C. (more preferably also at 90° C.) of less than 35%, more preferably less than 30%, especially less than 20%, particularly less than 15%, and more particularly less than 10%. This property of low compression set was not considered in the disclosure of WO88/00603 (Raychem), and prior art gels, particularly soft gels, having a very high compression set, typically at least 60%. In many prior art applications that is not a problem, and no consideration would be given to this property. In the preferred use of the present invention, where a cable etc. is built up possibly to a considerable extent for sealing to a cover, in the formation of a tight or pressurizable splice case, compression set is important.

The gel materials of WO88/00603 may, we have now discovered, be modified to achieve the balance of properties that we now desire. For example, the amount of liquid extender may be reduced such that it comprises from 40–50% (more preferably 30–55%) of the total gel, the block copolymer then preferably comprising 10–30% of the total (more preferably 17–23%). Secondly the polyphenylene oxide may be replaced by polyphenylene oxide/polyamide resin or equivalent, preferably where polyphenylene oxide domains are provided in a nylon 66 matrix. Where such a resin is provided having incompatability between the domains and the matrix, a compatibilizer, for example a grafted Kraton (trade mark) [SEBS, SBS, SIS polymers] may be used. A preferred material comprises that known by the General Electric trade mark, Noryl GTX a polyphenylene oxide/polyamide resin blend. A third modification is to choose a particular molecular weight of the block copolymer, preferably a peak molecular weight of from 257000 to 267000, the block copolymer preferably being Kraton G1651 (SEBS triblock copolymer).

The extender oil is preferably a paraffinic/naphthenic oil, particularly substantially aromatic-free, and preferably of high paraffinic content, for example at least 50%, especially at least 60%, more especially at least 65%.

We also prefer that the gel include a tackifier, such as a rubber block tackifier, such as polybutylene, particularly that known by the Amoco trade mark H300. This helps adhesion of the gel to the substrate and also to itself, for example when it is provided in sheet (including strip) form and is wrapped around the substrate and overlaps itself. Cohesive strength is also improved, the softening point may be increased, and extender volatility may be reduced. Such tackifier is preferably present as up to 35% of the gel, particularly 27–32%.

Gel or gelloid compositions within the scope of this invention are preferably defined by the following criteria (1) to (12) derived from Tests I to VII described subsequently, of which preferably not more than one criterion (not(1) or (2)) will be outside the specified ranges.

I. Cone Penetration
(1) Cone Penetration value in the ranges 30–400 (1/10 mm), preferable 100–400, especially 150–400.

II. Tensile Testing (at 23° C.)
(2) Ultimate Elongation >100%, preferably at least 200% more preferably at least 500%, especially at least 1000%.
(3) Ultimate Tensile Strength preferably less than 1.4 MPa, more preferably less than 1.2 MPa, especially less than 1 MPa.

III. Dynamic Viscoelastic Properties (23° C.).
(4) Dynamic Storage Modulus, G', less than $10^6$, preferably less than $5 \times 10^5$, more preferably less than $3.6 \times 10^5$, especially less than $2 \times 10^5$ dynes/cm @ 1Hz,
(5) Dynamic Complex Viscosity, Eta*, $<1 \times 10^5$ poise @1 Hz,
(6) Dynamic Mechanical Damping, Tan Delta, <1.00 at frequencies less than 5 Hz preferably less than 0.5, especially less than 0.3, and also at 1 Hz.

IV. Dynamic Viscoelastic Properties (80° C.).
(7) Dynamic Storage Modulus, $G' > 1 \times 10$ dynes/cm @ 1 Hz,
(8) Dynamic Complex Viscosity Eta*, $>1 \times 10$ poise @ 1 Hz.
(9) Dynamic Mechanical Damping, Tan Delta, <1.00 at frequencies less than 5 Hz.

V. Stress Relaxation
(10) Relaxation Time >900 seconds.

VI Compression Set
(11) Compression set (ASTM 395-A5) at 70° C., preferably also at 90° C., preferably less than 35%, more preferably less than 30%, especially less than 20%, particularly less than 15%, and more particularly less than 10%.

VII Initial Softening Point
(12) Initial softening point is preferably from 100°–200° C., more preferably 120°–200° C., especially 130°–200° C.

Test I: Cone Penetration

Test method ASTM D217, for testing cone penetration in greases, is applied to the gel or gelloid compositions of the present invention (hereafter referred to as gels for simplicity), using a standard full-scale cone, to determine the penetration at 23° C. by releasing the cone assembly from a penetrometer and allowing the cone to drop freely into the gel for 5 seconds.

The gel sample is contained in a straight-sided circular cylindrical container which is filled to the brim with the gel. The height of the beaker is 72 mm and its internal diameter is 74 mm. The surface of the sample should be level and free from defects where possible. Air bubbles, especially close to the surface of the sample, should be avoided, and the surface should be protected from dust prior to testing.

Each measurement should be made close to the centre of the sample but not directly in the same place each time. Surface damage caused by the cone is generally clearly visible and must be avoided when making a subsequent measurement.

Test II: Tensile Testing

The method for the tensile testing of gels is a modified version of ASTM D412 in which tensile strength and ultimate elongation are measured at 23° C. on dumb-bell shaped gel specimens that have not been prestressed. Ultimate elongation is measured by 'jaw separation' and tensile strength is based on the original cross sectional area of a uniform section of the specimen.

Tensile tests are performed on a power driven machine equipped to produce a uniform rate of grip separation of 50 mm/min for a distance of at least 1000 mm. The equipment should be capable of measuring the applied force to within 2% and of recording the resultant stress strain curve on a chart recorder. In the current work tensile stress strain measurements of the gel samples were made using an Instron floor model, TT-BM, fitted with a load cell capable of measuring to a lower limit full-scale deflection of 0.4 Newton. The load was indicated on a variable speed chart recorder to an accuracy of 0.5%.

Samples for tensile testing are cut from sheets of gel of uniform thickness between 1 and 6 mm using a Type 1 BS 2782/ISO 37 or a Type 3 ASTM D412 dumb-bell cutter.

The gel specimens once cut may be difficult to handle. This may be improved by wrapping the ends of each specimen in lint-free tissue up to the distance where the sample will protrude from the machine jaws (see below). This has also been observed to have the additional beneficial effect of restricting the flow of gel from within the grips themselves when the sample is tested, thereby improving the accuracy of the elongation measurement.

The tensile machine should first be calibrated in the normal way. Conventional air-grips may be used at an operating air pressure of approximately 20 psi. The dumb-bell sample is placed in the jaws of the air-grips such that the jaws will hold predominantly onto the tissue covering the ends of the specimen rather than the gel itself. Some exudation of the gel from the far ends of the grips may be observed on closing the jaws. This will not prove to be a problem provided that exudation into the restricted section of the sample, between the two grips, is minimal. The tissue wrap will help to minimise this in the case of very soft gels.

The sample is then tested to failure, which should ideally occur in the restricted section, at a cross-head speed of 50 mm/min and the stress-strain curve recorded on a chart recorder. A chart speed of 20 mm/min was found to be adequate for most samples.

The Ultimate Elongation of the sample may be obtained by calculating the cross-head movement from the chart recorder, knowing the speeds of both. The elongation as a percentage of the original gauge length may then be determined.

The sample will preferably undergo elastic deformation and recovery as aforesaid, by which is meant that the stretched sample will "snap back" substantially to its original unstressed state if released from the elongating tension.

Tests III, IV and V; Dynamic Viscoelastic Properties & Stress Relaxation

Characterisation of the intrinsic viscoelastic properties of gel materials may be preformed using a dynamic spectrometer.

Dynamic mechanical behaviour, in oscillating shear stress and strain conditions, makes it possible to calculate a storage modulus, $G'$, (or $G(T)$, the relaxation torque modulus in the case of stress relaxation), and a quantity responsible for the dissipation of energy as heat, $G''$. The complex dynamic viscosity, Eta*, may also be used to describe the 'viscous' characteristics of the mechanical behaviour when viscoelastic materials such as gels are deformed; part of the energy being stored as potential energy and part being dissipated as heat. The ratio of energy lost to energy stored in the system manifests itself as mechanical damping, Tan Delta. Such behaviour will vary over a time, temperature and frequency spectrum but may be used to predict the overall performance of a gel, especially with regard to structural effects resulting from molecular transitions, crystallisation, cross-linking, phase separation etc.

The storage and loss moduli, $G'$ and $G''$ respectively, together with the complex dynamic viscosity, Eta*, and mechanical damping, Tan Delta, are measured at 23° and 80° C. on 25 mm diameter disc specimens as a function of frequency. Similar specimens are used in the measurement of the elastic torque modulus, $G(T)$, as a function of time at 23° C. in stress relaxation.

Dynamic mechanical measurements on gels are performed on a suitable dynamic spectrometer such as a Rheometrics machine. In the current work a Rheometrics RDS-7700 has been used. The RDS-7700 is primarily a dynamic mechanical instrument for characterising the viscous and elastic behaviour of fluids and solids over an angular frequency of 0.1 to 100 rad/sec. and a temperature range of $-150°$ to 400° C. The main operating mode of the RDS is sinusoidal shear oscillation over four decades of amplitude. Steady shear rheological measurement over a shear rate range of 0.01 to 10,000 reciprocal seconds may also be performed. The viscoelastic response of materials to deformation is monitored by a precision air-bearing transducer enabling maximum torque sensitivity coupled with high stability and resonant frequency. Instrument control, data aquisition and analysis are performed by a DEC 11/23 Minc computer system.

Samples for dynamic mechanical testing are cut from sheets of gel of uniform thickness between 1 and 5 mm using a 25 mm diameter circular razor cutter. The samples are cleaned with lint-free wipes before testing in order to remove any unwanted surface deposits and surplus extender.

Procedure a) Frequency Sweeps.

The dynamic mechanical properties of gels are measured using the oscillatory parallel plate mode at 23° and 80° C. over an angular frequency range of 0.1 to 100 reciprocal seconds. Dynamic strain is generally maintained at 0.05 except for measurements at low rates and high temperatures in which cases larger deformations may be necessary to improve instrument signal resolution.

b) Stress Relaxation

Stress relaxation experiments are performed using the transient parallel plate mode, allowing the input of a pre-selected step strain level up to 100%. The decay of the resultant torque modulus and normal stress are measured as a function of time at constant temperature.

Specific examples of the preparation of compositions according to this invention will now be described.

A styrene ethylene butylene styrene block copolymer having a peak molecular weight between 257000 and 267000 (for example that known by the Shell trade mark Kraton G1651) was preblended with a polyphenylene oxide/polyamide resin (for example that known by the General Electric trade mark Noryl GTX), and optionally with some of the total requirement of an extender oil. A twin-screw extruder and/or CTM may be used. The resulting extrudate was then pelletized and/or ground. The pellets were then broken down and swollen with extender oil, and a package of stabilizer materials added where necessary. This was done in a melt processing mixer such as Banbury mixer. A molten material was obtained when all the ingredients were dispersed to give a truly homogeneous mixture. A mix temperature between 180°–200° C. is preferred. The material is thermoplastic and a gel formed on cooling, which may be made into suitable form, such as sheet (including tape), moulded parts, profiles, gaskets, O-rings etc. Techniques such as hot-melt dispersing, extrusion, injection moulding and press moulding may be used. The resulting materials have various uses, in particular environmental (including electrical) protection, especially in the splice cases described herein. Other instances include coverings for electrical terminal blocks.

The sealing material may be reinforced, especially to prevent or reduce extension which when installed is axial with respect to the substrate. Thus compression radially to enhance a seal will not cause excessive movement of material. Such reinforcement may comprise a fabric or fibres or rods etc. within the material.

The following three formulations may be mentioned, formulation B at present being preferred.

|  | A | B | C |
|---|---|---|---|
| Kraton G1651 | 12% | 20% | 25% |
| Noryl GTX | 1.2% | 2% | 2.5% |
| A 360 | 80.8% | 47% | 71.5% |
| H 300 | 5% | 30% | — |
| Stabilizers | 1% | 1% | 1% |

These formulations had the following properties

|  | A | B | C |
|---|---|---|---|
| Initial Softening Point | 131° C. | 174° C. | 176° C. |
| Dynamic Storage Modulus (23° C. 1Hz) Dynes/cm$^2$ | 54,000 | 180,000 | 359,000 |
| Dynamic Mechanical Damping (23° C. 1Hz) | 0.18 | 0.22 | 0.13 |
| Tensile Strength (23° C.) MPa | 0.4 | >0.8 | >1.2 |
| Elongation % | 1120 | >1350 | >1350 |
| Compression Set (70° C.) % | 15 | 7 | 6 |
| Compression Set (90° C.) % | 35 | 15 | 14 |

The present invention is further illustrated with reference to the accompanying drawings, in which:

FIGS. 2–4 are side views showing progressive steps in the installation of an embodiment according to the invention;

FIGS. 5–7 are side views showing progressive steps in the installation of another embodiment according to the invention;

FIG. 8 shows in perspective view the main parts of the assemblies shown in FIGS. 2–7;

FIG. 9 shows a sealing means for four cables;

FIGS. 10–12 shows a sealing means for one cable;

FIG. 14 shows an article for aiding installation;

FIG. 16 shows a sealing means consisting of sealing material;

FIG. 17 shows an alternative to FIGS. 9 and 13;

FIG. 18 shows an article for assessing the amount of sealing material required;

FIG. 19 shows an article for blanking-off an aperture in a sealing means;

FIG. 23b is a blown up view of the circled cross-section in FIG. 23a;

FIG. 25b is a cross-section of the channel in FIG. 25a;

FIG. 26b is an end view of the embodiment of FIG. 26a;

Figure 1:
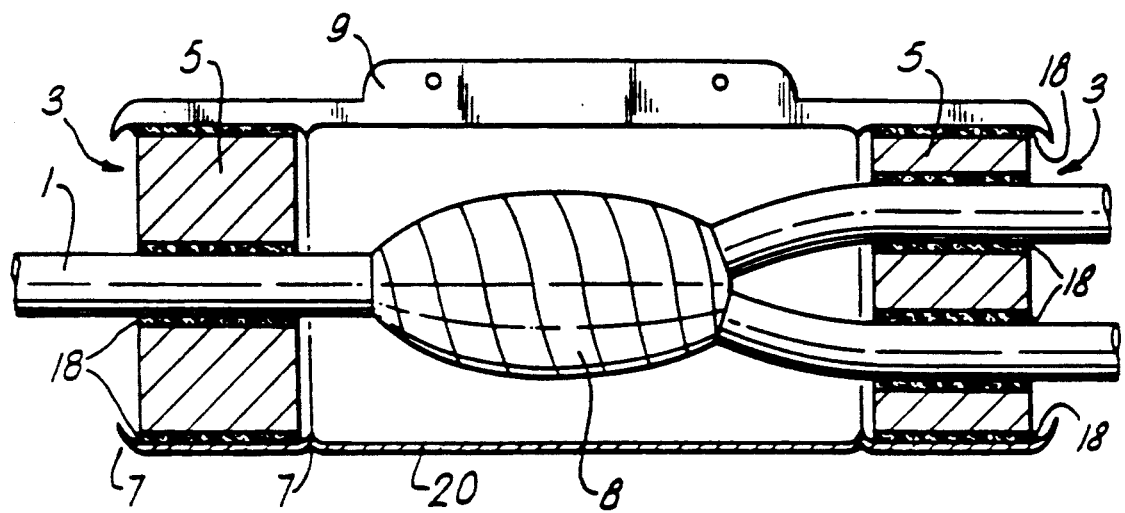
FIG. 1 shows a cable splice closure.

FIG. 1 shows a splice 8 between cables 4 enclosed by a closure of the invention. The closure comprises a cover 20 in the form of a dimensionally heat-stable wraparound sleeve, and sealing means 3. The sealing means 3 comprises a sealing material 18 and a substantially rigid portion 5. The sleeve may be shaped, for example as shown at 7, to aid retention of the sealing means 3. The sleeve 20 is shown in longitudinal section, the top part 9 terminating in a closure member at each of two opposing longitudinal edges of the sleeve. These edges (one of which is shown) may be held together by a channel or grabber 24 (see FIG. 8).

FIG. 2 shows in combination two wraparound heat-recoverable sleeves 2 pre-installed by partial recovery onto hinged aluminium inserts 4 having tapered fingers. The partially recovered combination is wrapped around cables entering the splice area 8. Closure channels 10 are positioned on rails 12 on the wrapped sleeve 2 to close the sleeve. End regions 14 of the sleeve (nearest the splice region) are bare of both rail and channel so that they provide a plain cylindrical surface. A metal bond bar 16 connects the two aluminium liners over the splice region. Strips of sealing material 18 preferably according to the invention are wrapped around the substrates within the sleeves 2.

FIG. 3 shows a central wraparound heat-stable sleeve 20 positioned to overlap the rail and channel-bare portions 14 of the heat-recoverable sleeves. The sleeve 20 may have the shape as shown or it may be shaped at its ends to correspond to the shape shown in FIG. 4. The central wraparound sleeve 20 has upstanding rails 22 which are held together by a securing means in the form of a metal grabber 24. The grabber 24 also engages the ends of channels 10 on the heat-recoverable sleeves 2. Sealing strips of silicone rubber (shown dotted) or of a sealing material according to the invention extend around the circumference of the overlap region between the heat-recoverable sleeves 2 and the heat-stable sleeve 20, and beneath the rails 22 of the heat-stable sleeve 20. Thus the heat-stable sleeve 20 is sealed closed and to the heat-recoverable sleeves 2. Finally, as shown in FIG. 4 the heat-recoverable sleeves 2 are heated to shrink them into engagement or contact with the underlying cables. Where two or more cables enter the splice region 8 a branch-off clip (not shown) may be used between them.

A second embodiment according to the invention is shown in FIGS. 5-7. Referring first to FIG. 5, rails 30 on the sleeve extend along the whole length of the heat recoverable sleeves 2. Only the channels 10 end short of one end. A channel member 32 acts as a temporary channel which together with channel 10 holds the whole length of a sleeve 2 closed during its recovery. A grabber 24 secures the channels 10 and insert channel members 32 together. Also a retention clip 34 secures the temporary channel member 32 to the tapered finger inserts 4, for alignment of the substrate.

Referring now to FIG. 6, after recover of sleeves 2 the securing grabber 24 is removed and the temporary channel inserts 32 and associated rail portions are removed by cutting with, for example, a wire or knife in a direction as indicated by arrow 36 in the Figure. Finally as shown in FIG. 7 the central dimensionally heat-stable sleeve 20 with upstanding rails is installed together with the grabber 24.

FIG. 8 shows in perspective the component parts of the embodiments of FIGS. 2-7 with like reference numerals indicating like parts. The additional features which can be seen in these drawings are the circumferential sealing strip cavities 40 in the heat-stable sleeve 20 and the aperture 42 in the tapered finger insert 4 for engaging the retention clip 34 of the temporary channel closure insert 32, and a branch-off clip 44 that can be positioned on an end of a sleeve 2 to form a plurality of conduits for branching cables. The clip preferably has a non-linear gap between its legs to aid retention of the clip before shrinkage of the sleeve. The sleeve 20 has a special closure 22, between which is positioned sealing material 18, and which may be locked closed by closure 10.

FIG. 9 shows a sealing means 3 that may be used, for example, in the enclosure of FIG. 1. Sealing means 3 comprises a sealing material 18 and substantially rigid parts 5a, 5b and 5c. The parts 5a, 5b and 5c may be held together by holding means such as screws 46 that preferably have sharp points 47 in order easily to penetrate the sealing material 18. The sealing material 18 may be provided attached to one or more of parts 5a, 5b and 5c or may be applied first to the cables or other substrates to be sealed. The parts 5a, 5b and 5c together define holes 48 through which substrates to be sealed will pass. Since the parts are separable, the sealing means can be installed around substrates without access to a free end thereof.

The outer surfaces of the means 3 may be provided with means for aiding retention of an external layer of sealing material (not shown) and such means for retaining may comprise a circumferentially-extending recess 50. Similar recesses 51 may be provided on the internal surfaces. Guide pins 49 may be provided to help align the parts 5a, 5b and 5c. The sealing material preferably comprises the sealing material of the invention. In particular we prefer a material of low compression set, and we have surprisingly found that cables can be sealed whose cross-sectional size is considerably less than that of the holes 48. This is advantageous since inventory is reduced. The cable diameter may be as little as, for example, 40% of the size of the hole, although we prefer 50%, more preferably 70%, especially 75%, particularly 80%. The larger differences in size can be accommodated with the preferred sealing materials of the invention to produce a good seal for the product lifetime generally expected of such cable accessories.

Figure 10:
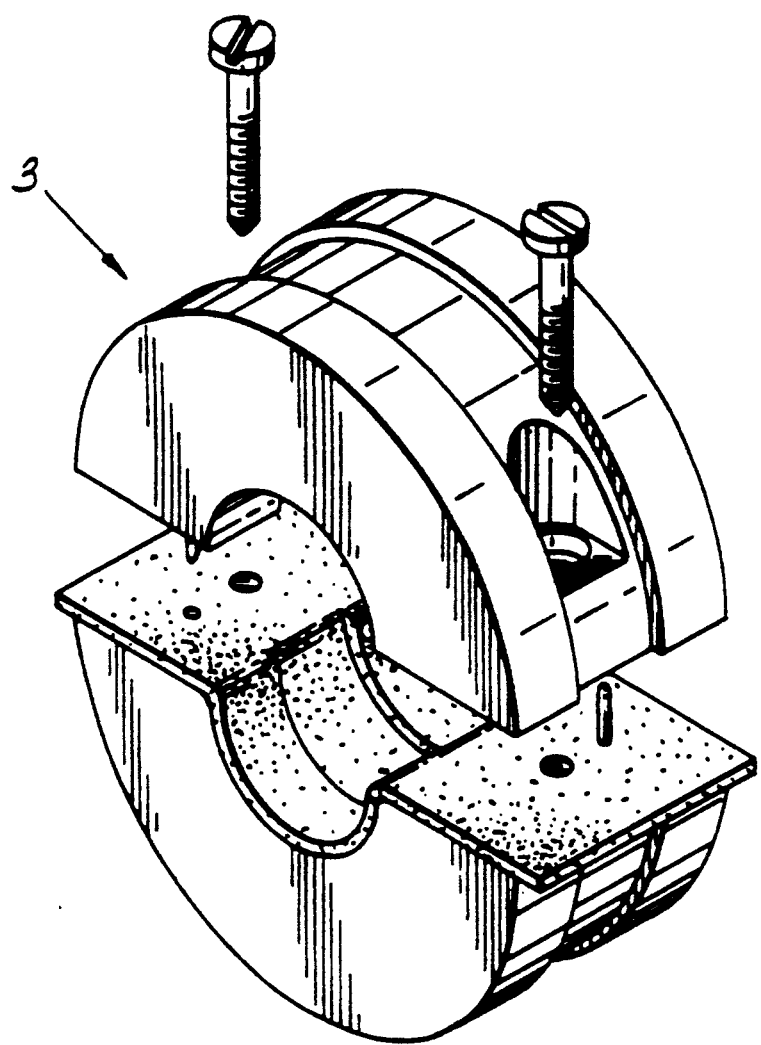

FIG. 10 shows a sealing means 3 analogous to that of FIG. 9, but for a single substrate.

FIGS. 11 and 12 show a way of installing a strip of sealing material 18 around a rigid portion 5 of a sealing means 3.

Figure 13:
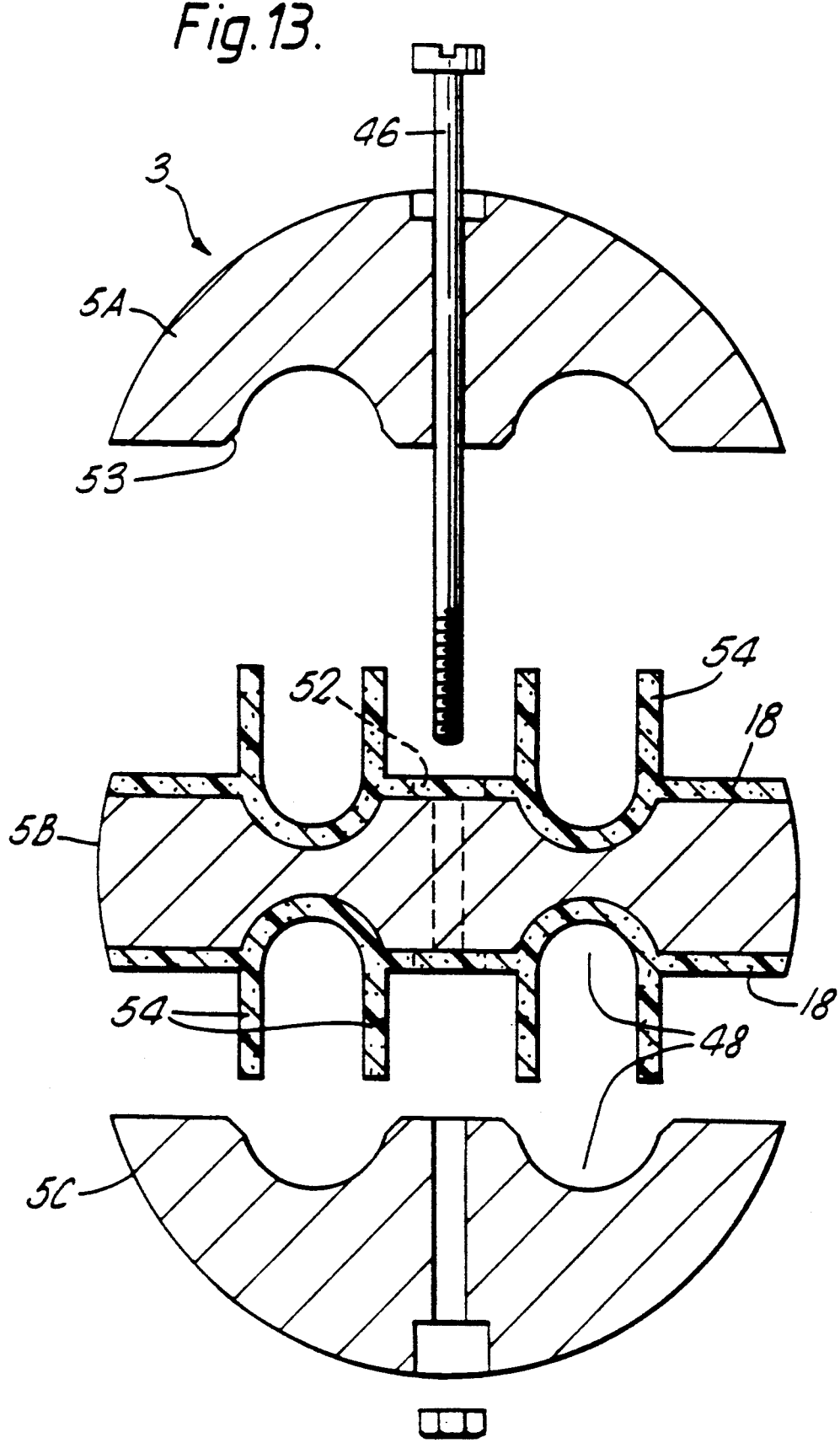
FIG. 13 shows a sealing means for four cables employing sealing material prefixed to a rigid portion thereof.

FIG. 13 shows a way in which sealing material 18 may be pre-affixed to at least one of the parts 5a, 5b and 5c. It may be supplied thus pre-affixed (produced for example by injection moulding) or a preshaped sealing material part may be installed thus in the field. A region 52 of sealing material may be missing to ease insertion of the screw 46. The parts 5a, 5b and 5c may be shaped to prevent or reduce shearing of the sealing material on assembly, for example by bevelling as shown at 53.

The sealing material may be provided with a web or other part 54 that may be wrapped or otherwise positioned around the substrate when positioned in the holes 48.

Figure 15A:
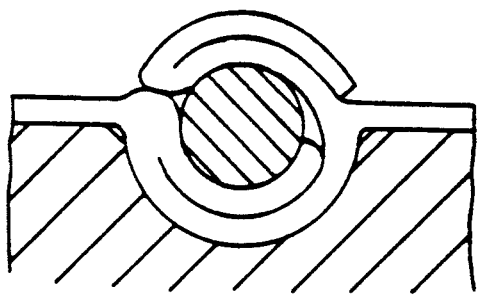
FIGS. 15a, 15b and 15c show installation of a sealing means for cables of various sizes.
Figure 15B:
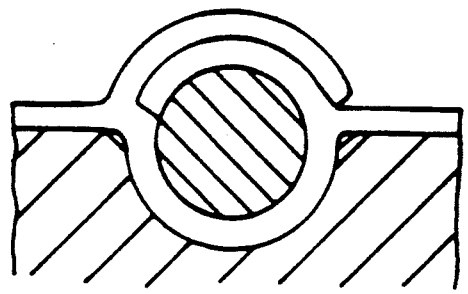
Figure 15C:
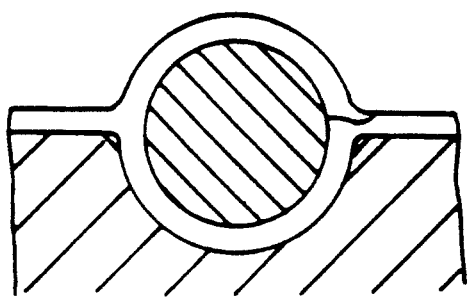

FIG. 14 shows an article 54 that may be used to aid installation of the sealing means shown in FIG. 13. The article 54 may comprise a card (or other sheet) having recesses 55 along an edge (or holes therethrough) which can be used to measure the cables or other substrates to be sealed. A position, A,B, or C, is determined where one of a pair of recesses accepts the cable, but the other of the pair does not. Adjacent each pair may be provided a drawing or other instructions showing how to deal with the web of sealing material for the appropriate size of cable. This is further illustrated in FIGS. 15a, 15b, 15c where the sealing material can be seen to be cut and wrapped in different ways.

FIG. 16 shows a sealing means 3 consisting substantially entirely of sealing material 18. The sealing material is split at position 56, for example, to allow cables to be laterally inserted into holes 48. Flaps 57 may be provided to aid formation of a sealed circumference. The sealing material of the invention is preferably used.

FIG. 17 shows an alternative design of sealing means 3 in which a rigid part 5 has laterally open holes 48 into which cables 1 may be inserted. The cables may be sealed to the part 5 by a sealing material 18, preferably in the form of a sheet (or tape) wrap. A cage or other support 58 may be provided around the outside of the sealing means 3. A wrap 59 of sealing material may provide a seal between the part 5 and the cage 58.

FIG. 18 shows how an article 60 may be used to judge how much sealing material 18 is to be installed, by tape wrapping etc, around a cable 1. The article 60, like the article 54 may be supplied as part of a kit of parts comprising sealing means/sealing material and cover etc.

FIG. 19 shows a blank, preferably cylindrical, wrapped with sealing material for use in temporarily or permanently blocking a hole 48 in a sealing means 3, where the sealing means has more holes than cables to be sealed.

Figure 20A:
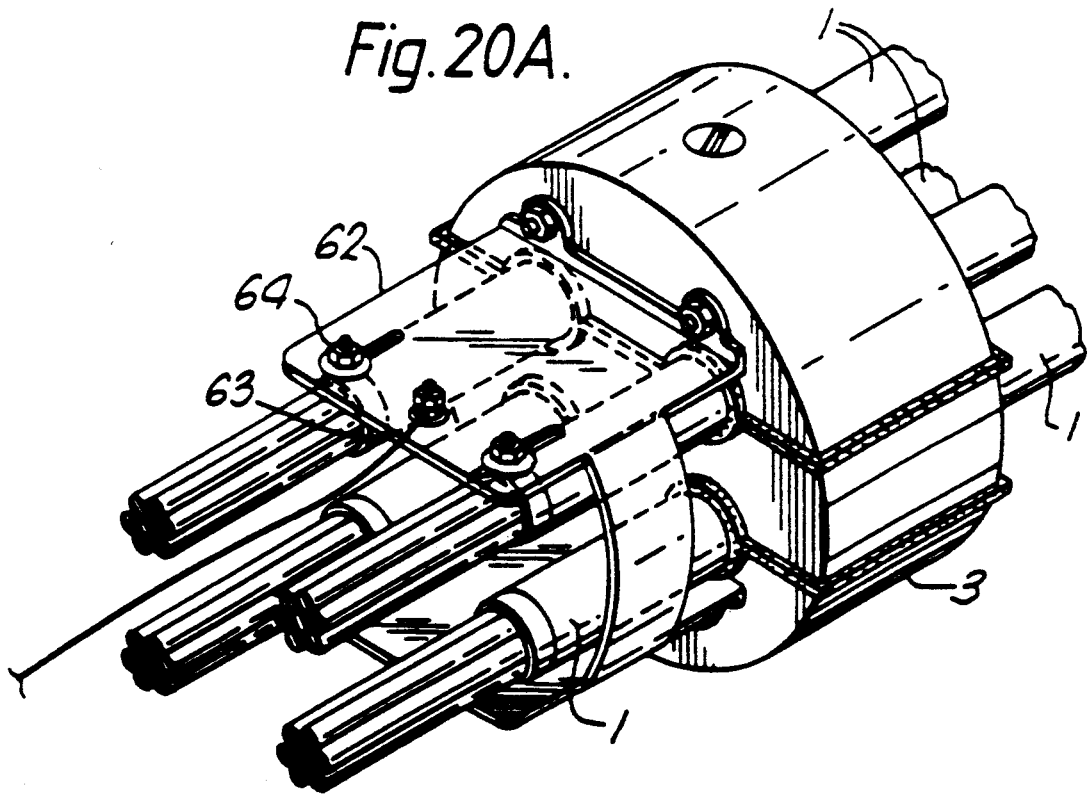
FIGS. 20a and 20b show how mechanical strength can be provided in a splice closure.
Figure 20B:
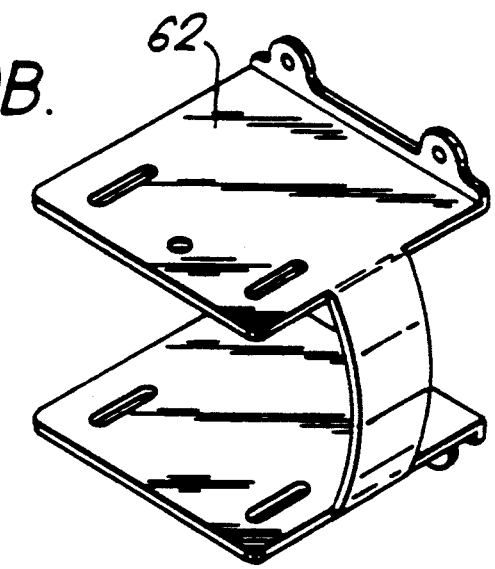

FIGS. 20a and 20b show a device 62 that may be secured to a sealing means to provide an enclosure with mechanical strength for example axial pull strength, or with electrical earth continuity. Armour 63 or other strength member of cables 1 may be secured to a flange or other part of device 62 by securing means such as bolt 64. Preferably inner plates (see FIG. 22) are fixed to the cables, allowing outer plates to move to deform a sealing material between them. The arrangement could, however, be reversed.

Figure 21:
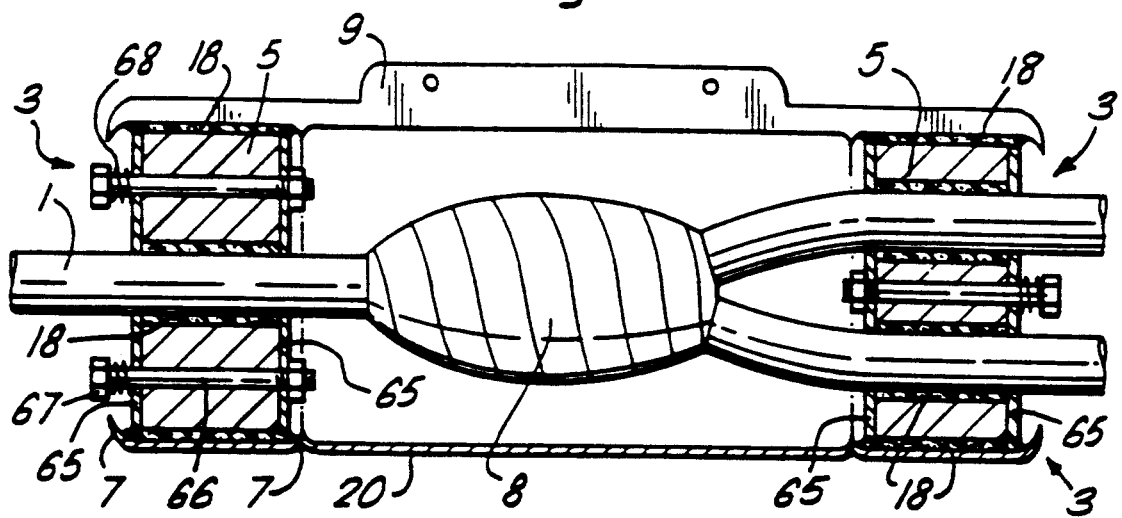
FIG. 21 shows a way in which a sealing material can be deformed.
Figure 22:
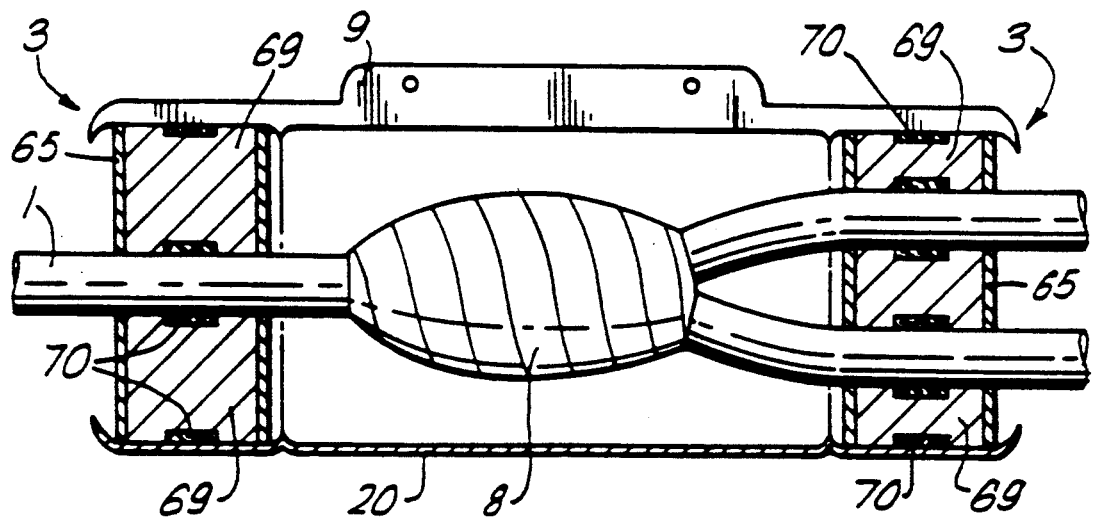
FIG. 22 shows the use of two gels or other sealing materials.

Some preferred features are shown in FIGS. 21 and 22 applied to a closure of the type illustrated in FIG. 1 although they may be taken alone or applied to other closures.

In FIG. 21 sealing means 3 comprises a deformable material 5, and optionally a further sealing material 18. Sealing material 18, where present may be, for example, a softer and/or more adhesive material than material 5. Means 65 is provided to contain and preferably also to deform material 5, and optionally also material 18. Means 65 preferably comprises a pair of plates through each of which passes one or more cables and around which bears the sleeve 20. The plates are therefore preferably substantially circular, depending on the shape of the sleeve. The plates are preferably moveable towards one another, preferably axially with respect to the cable or cables. This movement may be brought about by means 66, preferably a bolt along which a nut 67 may be screwed. The result of moving the plates together is to compress the sealing material axially, which results in its being deformed radially outwardly against the sleeve and/or inwardly against the cable or cables. This deformation may of course be transmitted via sealing material 18. If desired resilient means 68, such as a coil or other spring may be provided (optionally on one or more bolts 66) to maintain the sealing material 5 and/or 18 under compression.

The means 65 may be of "wrap around" design such that it can be installed around an intermediate portion of a cable, and may for example comprise split plates (parts of which may be hinged or otherwise joined together) where the split passes through a hole for the cables.

A further feature is shown in FIG. 22, which may be combined with any of those in FIG. 21 or with any items in this specification.

FIG. 22 shows how two materials 69 and 70 may be combined. Material 69 may be rigid but it is preferably a deformable sealing material, allowing the plates 65 to be brought together as described above. Material 69 preferably contains and/or restrains another, generally softer, sealing material 70. In this way, an environmental seal can be made by material 70. The volume of material 70 that is required is therefore reduced, and due to the small space it occupies, the effect of its creep is reduced.

Figure 23A:
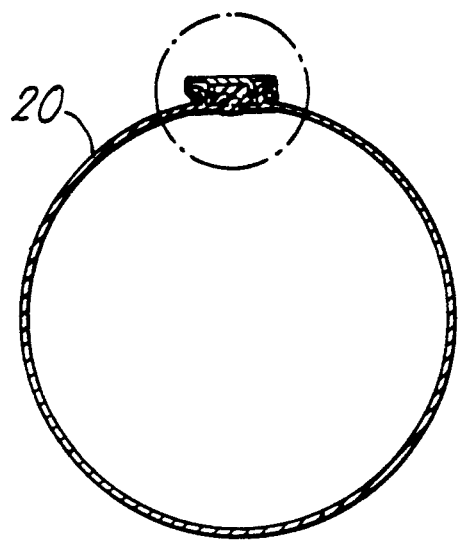
FIG. 23a illustrates in transverse cross-section a wrap around sleeve.
Figure 23B:
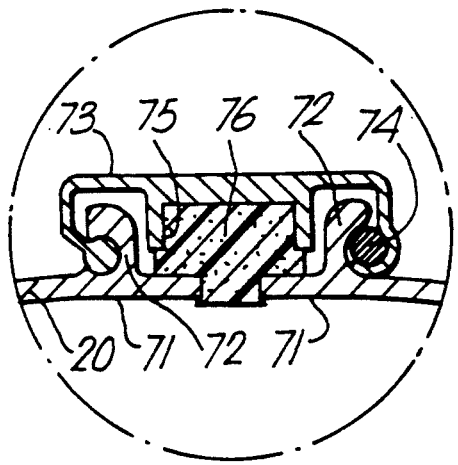

FIG. 23 illustrates in transverse cross-section a wraparound sleeve or central portion 20 of a splice case, having protuberances, often known as rails, 72 which can be held together by a channel 73, thereby maintaining the sleeve in the closed or wrapped-around configuration. The channel may interlock one of the rails by a hinge-type of mechanism (the left-hand rail as drawn) and be secured to at least a part of the other rail by means such as a rod 74 that traps the channel. In this way the channel may be positioned in place radially with respect to the sleeve, even through the rod 74 may require longitudinal sliding in place. This channel 73 may have a reservoir 75 that carries a sealing material 76, such as a gel. The radial positioning of the channel is useful where a sealing material is employed since there is then no shear on the material and it can be forced in the desired direction to fill any void between the edge portions 71.

Figure 24:
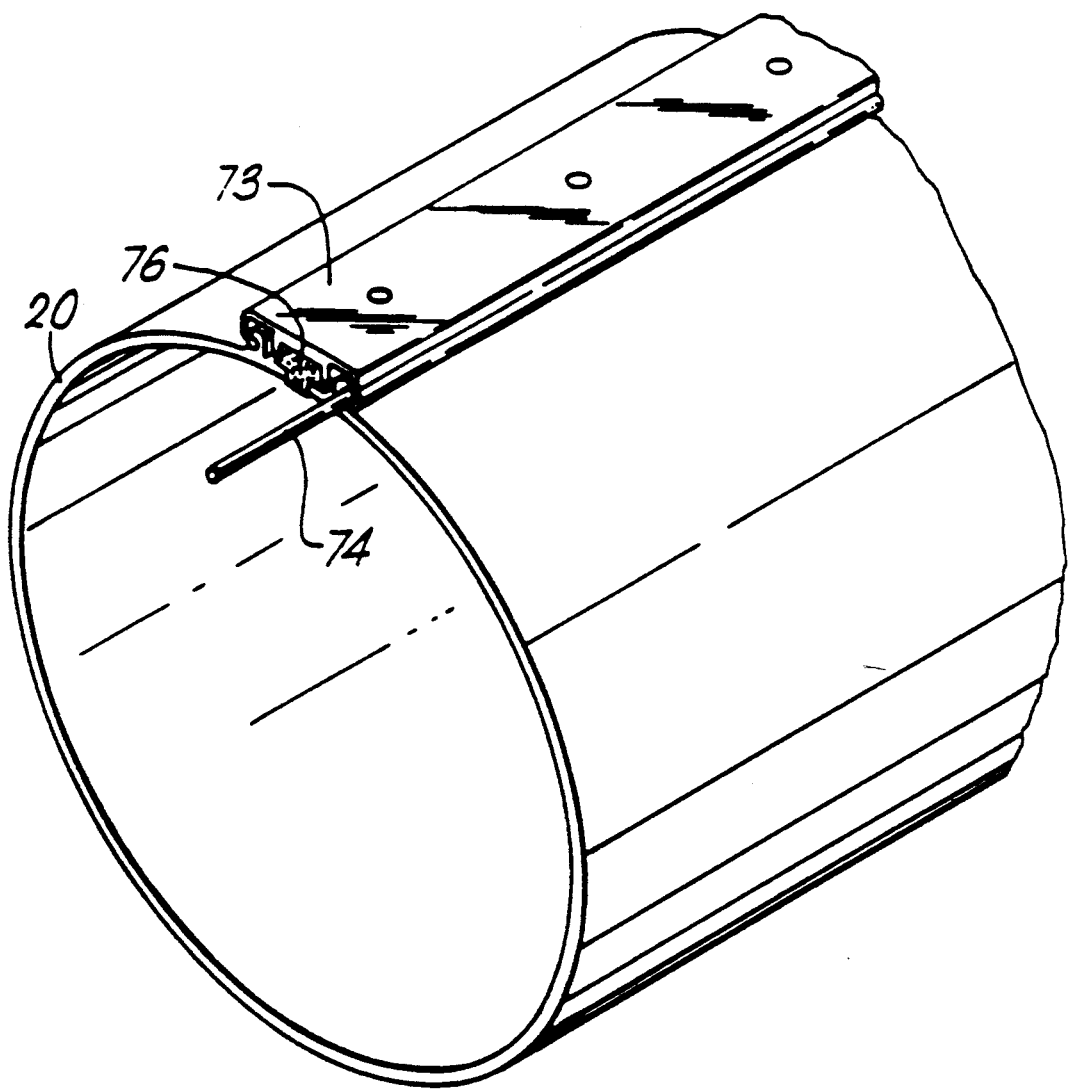
FIG. 24 is a perspective view of a sleeve embodiments of the invention.

A perspective view of such a sleeve is shown in FIG. 24.

Figure 25A:
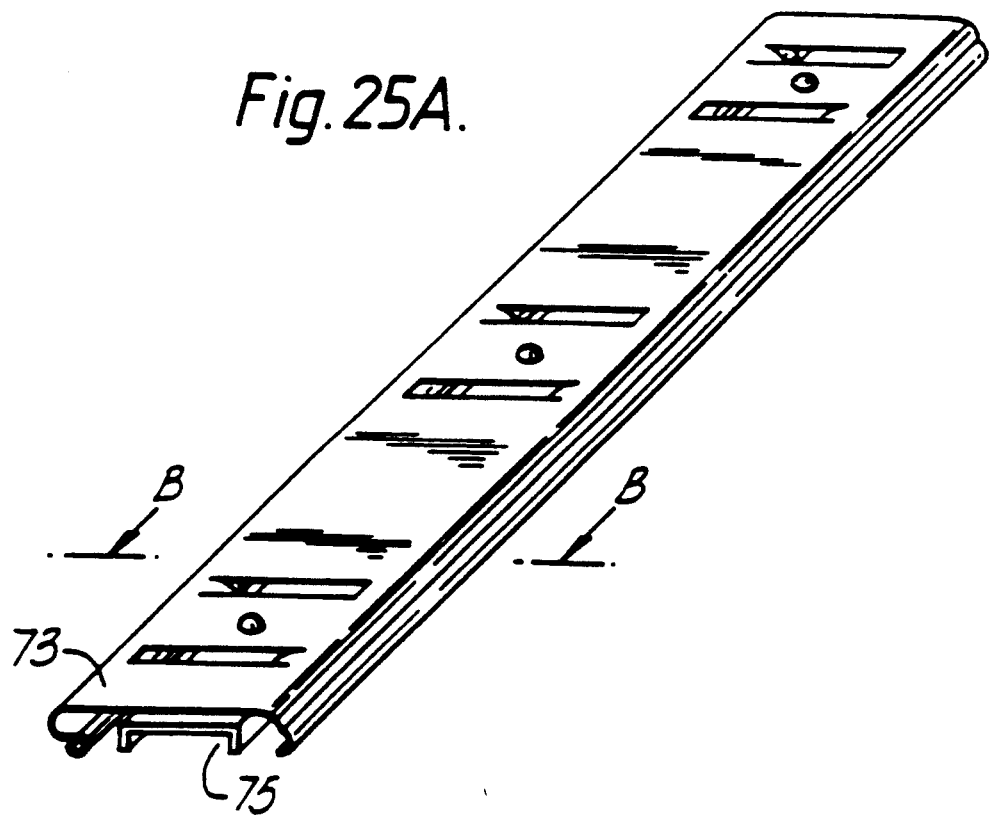
FIG. 25a is a perspective view of a channel embodiment for the sleeves.
Figure 25B:
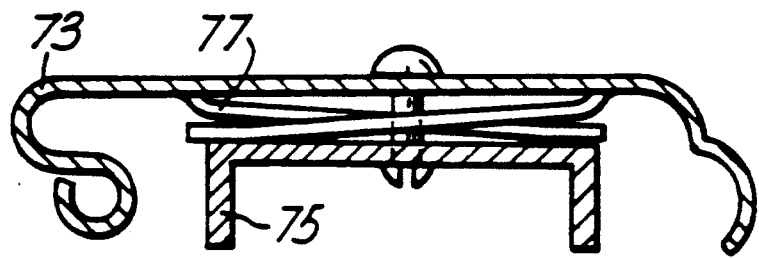

The channel 73 is shown in FIGS. 25A and 25B. Here it has resilient means such as a spring 77 to cause the reservoir 75 to force a sealing material in the desired direction. Alternatively, the resilient means may be separate from the channel thus allowing easy installation of the channel. Once the channel is properly installed the resilient means can be applied to bias a sealing material as desired, for example via reservoir 75. Such resilient means may comprise springs that are inserted through slots in the top of channel 73, and optionally then slid to apply a wedging action between reservoir 73 and channel 75.

Figure 26A:
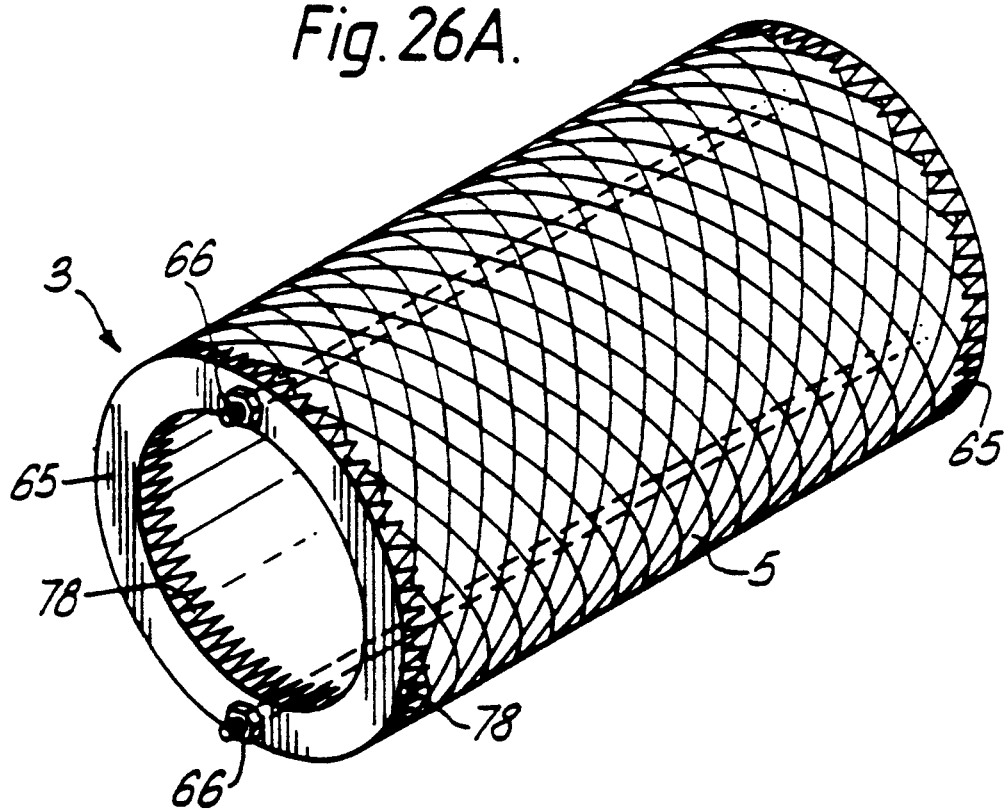
FIG. 26a is a perspective view of an embodiment of sealing means 3 of for example FIG. 21.
Figure 26B:
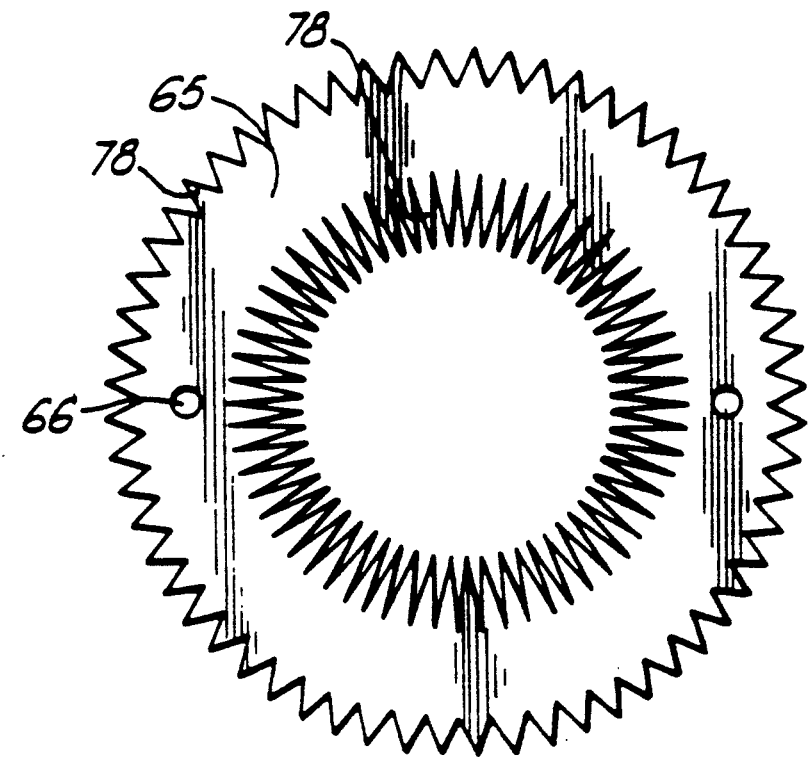

FIGS. 26A and 26B show an embodiment of the sealing means 3 of for example FIG. 21. Here the means has end plates 65 having tapering fingers 78 on their external surfaces (that which seals to the outer sleeve 20) and/or on their internal surfaces (that or those which seal to a cable or cables passing through). These tapering fingers 78 give the plates a crowned appearance and can provide some variation in diameter to suit sleeves and/or cables of different sizes. Means 66 may be provided to draw together plates 65 at opposite ends of the sealing means 3 thereby deforming a sealing material 5 positioned between them. The crowns thus serve as a variable size retaining means for the sealing material.

Figure 27A:
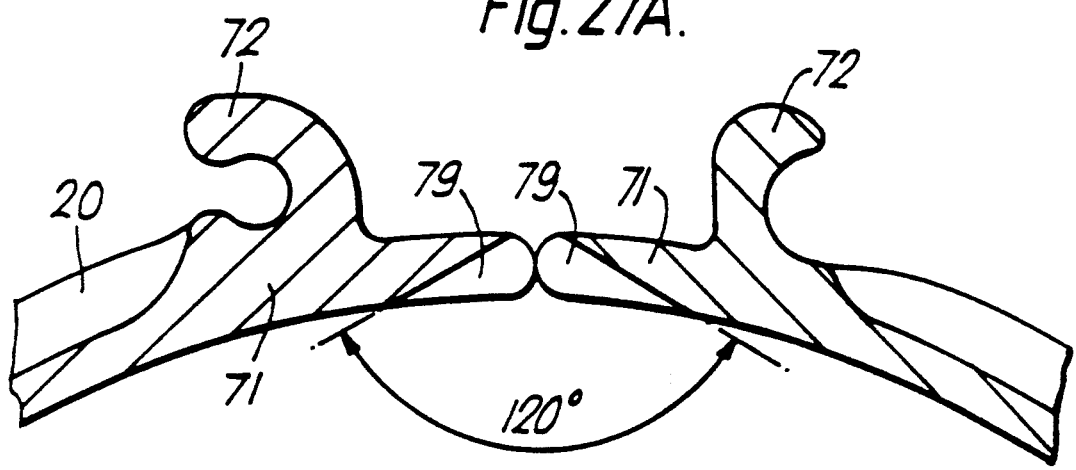
FIG. 27a illustrates a transverse cross-section through the edge portions of a sleeve embodiment of the invention.
Figure 27B:
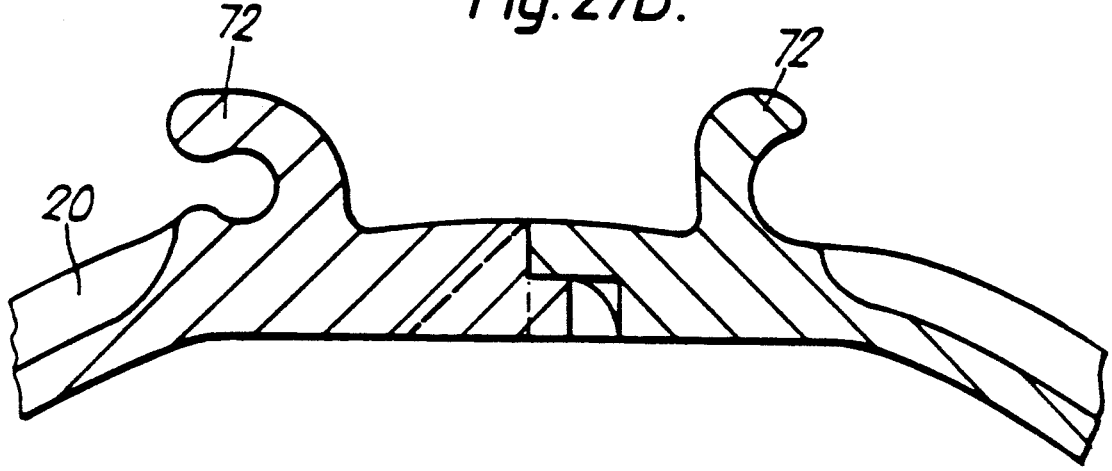
FIG. 27b is an alternative embodiment of a transverse cross-section through the edge of a sleeve embodiment of the invention.

FIGS. 27A and 27B show transverse cross-sections through edge portions 71 of a sleeve 20 for example as illustrated in FIGS. 21 and 23. The section of FIG. 27A is taken at a position of the sleeve that surrounds a sealing means 3, whereas the section of FIG. 27B applies at positions between the sealing members (and may also overlap each sealing member). The difference between the two sections is that the section of FIG. 27A has a hole 79 through which a sealing material 76 (see FIG. 23) may pass. This is desirable so that the sealing material of the longitudinal seal of the sleeve 20 can touch and seal to the circumferential seal between the cables and sleeve provided by the sealing means 3. The hole 79 preferably tapers towards the outside of the sleeve, an angle of taper of say 120° or 135° being preferred but angles from 30°–160°, especially 60°–140° will in general be suitable. This hole is preferably about 1.5–10 mm, particularly 2–6 mm at its narrowest, and it preferably extends 1–4 cms, particularly 1.5–2.5 cms along the length of the sleeve. The two edges of FIGS. 27A or B may interlock in tongue-and-groove fashion. Alternatively or additionally, an overlying flange (as shown in FIG. 27B) may have a downward facing projection that snaps into a recess in an underlying flange.

Figure 28A:
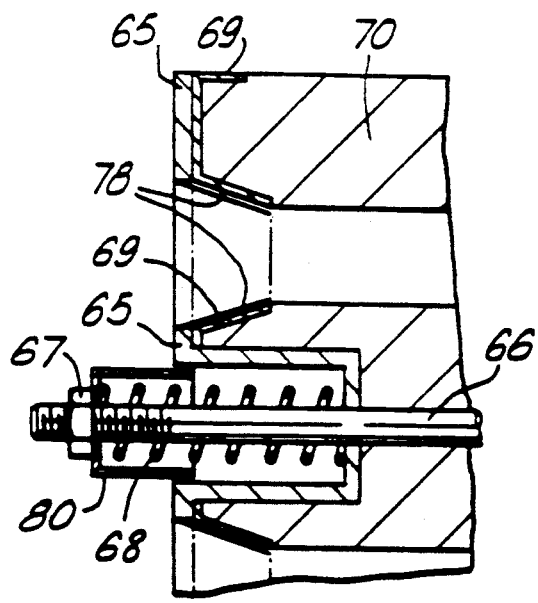
FIG. 28a illustrates in detail a portion of an end sealing means of an embodiment of the invention.
Figure 28B:
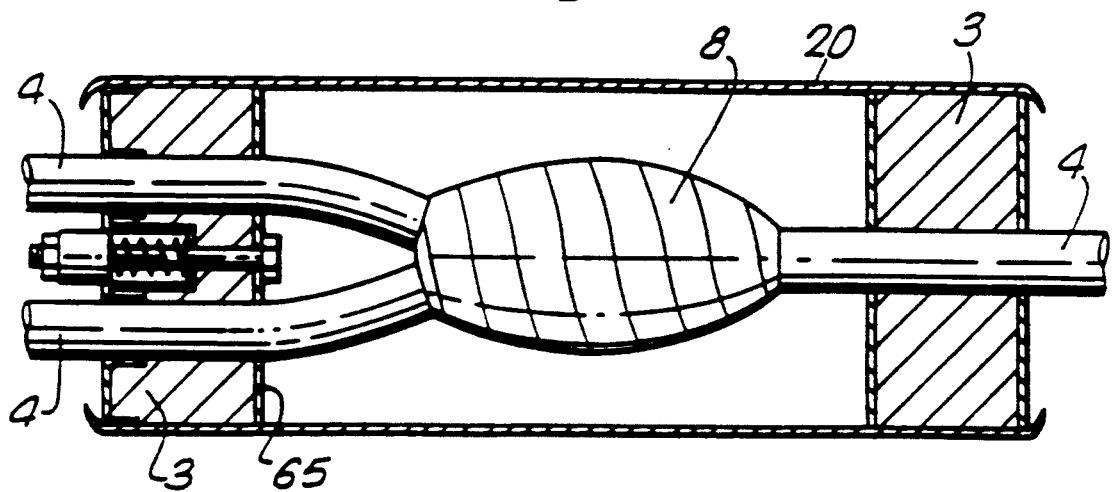
FIG. 28b illustrates a cross sectional view of a splice case embodiment of the invention.

FIG. 28A illustrates in detail a portion of an end sealing means 3 from FIG. 28B which illustrates a splice case.

FIG. 28A shows a soft gel (or other sealing material) 70 located by a hard gel (or other sealing material) 69. Wrap-around end plates 65 (a substantially rigid portion as referred to herein) having crowns 78 are located either side of the hard gel 69. The crowns help to retain the gel and optionally to direct it in the desired way as it is being deformed by the end plates as they move together, in particular to restrain the gel against axial extension. The end plates 65 may be of the type illustrated in FIG. 26. A spring 68, tensioned by means 66 comprising for example a bolt and a nut 67 acting through resilient means such as a coil spring 68. Thus, a resilient bias can be put on the sealing material 70 that can accommodate any creep during service life of the splice case and maintain a seal between cables 4 and sleeve 20. Instead of a simple nut and bolt, a ratchet mechanism may be provided, releasable by for example slightly turning "nut" 67 with respect to means 66, and tightened for example levering the "nut" along means 66.

The spring may be partly housed within the sealing means 3, and a part protruding may then act to indicate the extent to which it has been tensioned. The spring 20 may be positioned within a cylindrical or other housing 80 which may help to locate it and facilitate viewing to determine tensioning, by for example providing markings on the housing 80, or by arranging for proper tensioning to occur when the housing 80 is flush with the flange 65. Preferably, the spring will not begin to be compressed until the plates have been brought together sufficiently to begin to apply a compressive force on the sealing material; in this way the extent of compression of the spring will be an indication of the force on the sealing material.

Plugs, for example of sealing material, may be provided in unused outlets. Such plugs may have a diabolo shape to correspond to the shape of the crowns 78 (one of which is shown and another of which may be provided on an inner end plate complementing out end plate 65, as shown in FIG. 22).

The end plates 65 of FIG. 28A etc may comprise the following design. An end plate may comprise an inner part (which may comprise one or more sub-parts, and through which means 66 may run or to which it may be attached) and one or more (preferably two) outer parts that in use at least lie substantially coaxially around the inner part. The or each outlet for the cables preferably lies partly in the inner part and partly within an outer part and is thus formed into an outlet of closed cross-section when the inner and outer parts are brought together. In this way, the end parts may be of "wraparound" design.

The inner part may be of generally star or cruciform-shape, where intersections of the arms of the cross have a semi-circular concave surface, preferably carrying half of crown 78. The outer part has corresponding semi-circular concave surfaces also carrying half of crowns 78.

Two outer parts are preferably provided, preferably substantially semi-cylindrical. Each such part preferably pivots about a line adjacent its longitudinal edge, the two being pivotally connected to mutually adjacent positions of the inner part, preferably adjacent the ends of one of the arms of the cross when the inner part is of cruciform shape. The two outer parts may then be closed, clam-shell like, around the inner part, and optionally locked closed.

Two ends plates of that design are preferably provided with a gel or other sealing material therebetween. The sealing material may be shaped similarly to the inner and outer parts, and parts of the sealing material may be bonded or otherwise fixed to corresponding parts of the end plates. The end plates may then be drawn together to deform the sealing material as required.

For the avoidance of doubt it is noted that the invention preferably provides an enclosure, a sealing means and a sealing material, the enclosure allowing installation without heat-shrinkage and easy reentry, particularly through the use of a sealing material of low compression set. Any of the various closure designs or sealing materials may be selected, and in particular any of the features of FIGS. 25 and/or 28A and associated descriptions may be used alone or together with other features disclosed herein.

We claim:
1. A cable test comprising:
  (a) a substantially rigid portion:
  (b) a sealing material retained by the portion (a);
the portion (a) comprising two end parts between which is positioned the sealing material and that can be moved towards one another thereby providing a compressive force on the sealing material, each end part comprising an inner part and one or more outer parts that in use lie around the inner part, a port for a cable being provided partly within the inner part and partly within the outer part the port thereby being formed into a port of substantially closed cross-section when the inner and outer parts are brought together.

2. A seal according to claim 1, in which the inner part of the portion (a) is substantially star-shaped or substantially cruciform in cross-section.

3. A seal according to claim 2, in which intersections of arms of the star or cross have a substantially semi-circular concave surface, and in which the outer part has a substantially circular port for a cable.

4. A seal according to claim 1, in which the port has a frusto-conical inner surface.

5. A seal according to claim 4, in which a said port in each end part has a frusto-conical inner surface, such surface of each port tapering towards the other end part.

6. A seal according to claim 4, in which the frusto-conical inner surface is formed by tapering fingers.

7. A seal according to claim 6, in which the tapering fingers serve as a variable-size retaining means for the sealing material.

8. A seal according to claim 1, in which the portion (a) includes two said outer parts that are hinged to close around said inner part.

9. A seal according to claim 1, which additionally comprises means for causing the end parts to move towards one other.

10. A seal according to claim 9, in which the means for causing the end parts to move towards one another comprises a spring that can maintain the sealing material under compression.

11. A seal according to claim 10, in which the spring is carried on a bolt that interconnects the two end parts.

12. A seal according to claim 1, in which the sealing material comprises a gel.

13. A cable splice case which comprises a seal according to claim 1, and a tubular housing for the splice, the seal being capable of sealing an annular space between a cable the housing.

14. A seal according to claim 1, wherein the sealing material has an elongation of at least 100% and a compression set at 70° C. of less than 30% and a dynamic storage modulus at 23° C. and at 1 Hz less than $10^7$ dynes/cm$^2$.

15. The seal according to claim 14 wherein the sealing material has a compression set at 70° C. of less than 15%.

16. The seal according to claim 14 wherein the sealing material has an elongation of at least 500%.

17. The seal according to claim 16 wherein the sealing material comprises a styrene ethylene butylene styrene block copolymer extended with a mineral oil.

18. The seal according to claim 17 wherein the sealing material additionally comprises a compatiblizer.

19. The seal according to claim 14 wherein the sealing material comprises a gel.

20. The seal according to claim 14 wherein the sealing material comprises a block copolymer extended with an oil, together with a polyphenylene oxide/polyamide resin blend.

21. The seal according to claim 1 wherein the sealing material has the following properties:
Initial softening point 160°–180° C.
Dynamic storage modulus $1.5 \times 10^5$–$2 \times 10^5$ Dynes/cm$^2$ (23° C., 1 Hz)
Dynamic mechanical damping 0.15–0.4 (23° C., 1 Hz)
Tensile strength 23oC less than 1.0 MPa
Elongation greater than 1000%
Compression set (70° C.) less than 10%
Compression set (90° C.) less than 20%.

22. The seal according to claim 21 wherein the sealing material comprises (a) a block copolymer containing relatively hard blocks and relatively elastomeric blocks; (b) additional polymer or copolymer having at least partial compatability within a higher glass transition or softening temperature than the hard blocks of the block copolymer; and (c) an extender liquid which extends and softens the elastomeric block of said block copolymer.

* * * * *

UNITED STATES PATENT AND TRADEMARK OFFICE
CERTIFICATE OF CORRECTION

PATENT NO. : 5,313,019
DATED : May 17, 1994
INVENTOR(S) : Brusselmans et al

It is certified that error appears in the above-indentified patent and that said Letters Patent is hereby corrected as shown below:

Column 8, line 16, (Claim 1, line 1) replace "test" by --seal--.

Column 18, line 65, (Claim 13, line 4) after "cable" insert --and--.

Column 20, line 7, (Claim 21, line 7) replace "23oC" by --23°C--.

Signed and Sealed this

Twelfth Day of September, 1995

Attest:

BRUCE LEHMAN

*Attesting Officer*     *Commissioner of Patents and Trademarks*